(12) United States Patent
Kim et al.

(10) Patent No.: US 11,516,857 B2
(45) Date of Patent: Nov. 29, 2022

(54) METHOD AND DEVICE FOR PERFORMING WIRELESS COMMUNICATION IN UNLICENSED BAND

(71) Applicant: KT CORPORATION, Gyeonggi-do (KR)

(72) Inventors: Ki-tae Kim, Seoul (KR); Ki-hyeon Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/051,351

(22) PCT Filed: Jul. 11, 2019

(86) PCT No.: PCT/KR2019/008606
§ 371 (c)(1),
(2) Date: Oct. 28, 2020

(87) PCT Pub. No.: WO2020/013645
PCT Pub. Date: Jan. 16, 2020

(65) Prior Publication Data
US 2021/0235513 A1    Jul. 29, 2021

(30) Foreign Application Priority Data

Jul. 13, 2018 (KR) .................. 10-2018-0081886
Aug. 9, 2018 (KR) .................. 10-2018-0093040
Jul. 10, 2019 (KR) .................. 10-2019-0083074

(51) Int. Cl.
*H04W 16/28*    (2009.01)
*H04W 74/08*    (2009.01)
*H04W 56/00*    (2009.01)

(52) U.S. Cl.
CPC ....... *H04W 74/0891* (2013.01); *H04W 16/28* (2013.01); *H04W 56/001* (2013.01); *H04W 74/0816* (2013.01)

(58) Field of Classification Search
CPC ............. H04W 74/0891; H04W 16/28; H04W 56/001; H04W 74/0816; H04W 16/14; H04W 74/0808; H04W 24/10; H04W 56/00; H04W 72/042
See application file for complete search history.

(56) References Cited

U.S. PATENT DOCUMENTS

2017/0331670 A1    11/2017 Parkvall et al.
2018/0227166 A1    8/2018 Palenius et al.
(Continued)

FOREIGN PATENT DOCUMENTS

WO    2017/196249 A1    11/2017

OTHER PUBLICATIONS

Ericsson (SS Burst Set Composition, R1-1706008, Mar. 2017).*
(Continued)

*Primary Examiner* — Lakeram Jangbahadur
(74) *Attorney, Agent, or Firm* — IP Legal Services, LLC

(57) ABSTRACT

Provided are a method and device for performing wireless communication in an unlicensed band. The method, for performing wireless communication in an unlicensed band by a terminal, may include: receiving configuration information relating to a synchronization signal block (SSB) burst set in an unlicensed band; receiving transmission interval information in which an SSB is transmitted in the SSB burst set on the basis of a listen-before-talk (LBT) result with respect to the unlicensed band; and detecting the SSB in the SSB burst set on the basis of the transmission interval information.

6 Claims, 29 Drawing Sheets

(56) References Cited

U.S. PATENT DOCUMENTS

| | | |
|---|---|---|
| 2018/0234153 A1 | 8/2018 | Lincoln et al. |
| 2019/0158345 A1* | 5/2019 | Lincoln et al. |
| 2019/0174466 A1* | 6/2019 | Zhang ................... H04L 5/005 |
| 2020/0008131 A1* | 1/2020 | Chakraborty ......... H04W 16/28 |
| 2020/0028745 A1 | 1/2020 | Parkvall et al. |
| 2020/0304362 A1 | 9/2020 | Palenius et al. |
| 2021/0014895 A1* | 1/2021 | Wu ...................... H04L 1/0067 |
| 2021/0051683 A1* | 2/2021 | Li ..................... H04W 74/0808 |

OTHER PUBLICATIONS

Huawei (Initial access in NR unlicensed, R1-1805920, May 2018).*
Samsung (Composite Beam Transmission for SS blocks, R1-1714594, Aug. 2017).*
InterDigital (On NR-PBCH DMRS Design and Time Index Indication, R1-1714132, Aug. 2017).*
Ericsson, "SS Burst Set Composition", R1-1706008, 3GPP TSG-RAN WG1 Meeting #88bis, Spokane, U.S., Apr. 3-7, 2017, pp. 1-6.
Huawei et al., "Initial access in NR unlicensed", R1-1805920, 3GPP TSG RAN WG1 Meeting #93, Busan, Korea, May 21-May 25, 2018, pp. 1-6.
InterDigital Inc., "On NR-PBCH DMRS Design and Time Index Indication", R1-1714132, 3GPP TSG RAN WG1 Meeting #90, Prague, Czech Republic, Aug. 21-25, 2017, pp. 1-9.
Samsung, "Composite Beam Transmission for SS blocks", R1-1714594, 3GPP TSG RAN WG1 Meeting #90, Prague, Czech Aug. 21-25, 2017, pp. 1-5.

* cited by examiner

FIG.15

| System | SSB indication pattern | SSB index (L=8) | | | | | | | |
|---|---|---|---|---|---|---|---|---|---|
| | | 0 | 1 | 2 | 3 | 4 | 5 | 6 | 7 |
| NR | - | 1 | 0 | 0 | 0 | 1 | 0 | 0 | 0 |
| NR-U | 1 | 1 | 0 | 0 | 0 | 1 | 0 | 0 | 0 |
| | 2 | 0 | 0 | 1 | 0 | 0 | 0 | 1 | 0 |
| | ... | ... | ... | ... | ... | ... | ... | ... | ... |

FIG.25

|  | SSB index | | | | | | | |
|---|---|---|---|---|---|---|---|---|
|  | #0 | #1 | #2 | #3 | #4 | #5 | #6 | #7 |
| Reference point | O | O | O | O | X | X | X | X |
| 1st transmission (beam info.) | O (P0) | O (P1) | O (P2) | O (P3) | X | X | X | X |
| 2nd transmission (beam info.) | X | X | O (P0) | O (P1) | O (P2) | O (P3) | X | X |

FIG.26

|  | SSB index | | | | | | | |
|---|---|---|---|---|---|---|---|---|
|  | #0 | #1 | #2 | #3 | #4 | #5 | #6 | #7 |
| Reference point | O | O | O | O | X | X | X | X |
| 1st transmission | O | O | O | O | X | X | X | X |
| 2nd transmission | X | X | O | O | O | O | X | X |

METHOD AND DEVICE FOR PERFORMING WIRELESS COMMUNICATION IN UNLICENSED BAND

CROSS REFERENCE TO RELATED APPLICATIONS

This application is a National Stage Patent Application of PCT International Patent Application No. PCT/KR2019/008606 (filed on Jul. 11, 2019) under 35 U.S.C. § 371, which claims priority to Korean Patent Application Nos. 10-2018-0081886 (filed on Jul. 13, 2018), 10-2018-0093040 (filed on Aug. 9, 2018), and 10-2019-0083074 (filed on Jul. 10, 2019), the teachings of which are incorporated herein in their entireties by reference.

TECHNICAL FIELD

The present disclosure relates to methods and devices for performing wireless communication considering the results of a listen before talk (LBT) for an unlicensed band in a next-generation wireless access network (hereinafter, "new radio (NR)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

As a part of such aspect, it is required to develop a design for transmitting and receiving a synchronization signal block (SSB) in order to perform wireless communication using an unlicensed band in NR.

DETAILED DESCRIPTION OF THE INVENTION

Technical Problem

According to embodiments, there may be provided a method and device for performing wireless communication in an unlicensed band to minimize the transmission/reception complexity of a synchronization signal block considering the results of an LBT upon transmitting a synchronization signal block for access in an unlicensed band.

Further, according to embodiments, there may be provided a specific method and device for performing beam estimation and applying an LBT-based beamforming pattern in an unlicensed band.

Technical Solution

In an aspect, according to embodiments, there may be provided a method for performing wireless communication by a user equipment (UE) in an unlicensed band. The method may include receiving configuration information about a synchronization signal block (SSB) burst set in the unlicensed band, receiving information about a transmission interval in which an SSB is transmitted in the SSB burst set based on a result of a listen before talk (LBT) for the unlicensed band, and detecting the SSB in the SSB burst set based on the transmission interval information.

In another aspect, according to embodiments, there may be provided a method for performing wireless communication by a base station in an unlicensed band. The method may include transmitting configuration information about a synchronization signal block (SSB) burst set in the unlicensed band, performing a listen before talk (LBT) for the SSB burst set in the unlicensed band, and transmitting information about a transmission interval in which an SSB is transmitted in the SSB burst set based on a result of the LBT.

In still another aspect, according to embodiments, there may be provided a UE performing wireless communication in an unlicensed band. The UE may include a receiver receiving configuration information about a synchronization signal block (SSB) burst set in the unlicensed band and receiving information about a transmission interval in which an SSB is transmitted in the SSB burst set based on a result of a listen before talk (LBT) for the unlicensed band, and a controller detecting the SSB in the SSB burst set based on the transmission interval information.

In yet still another aspect, according to embodiments, there may be provided a base station performing wireless communication in an unlicensed band. The base station may include a controller performing a listen before talk (LBT) for a synchronization signal block (SSB) burst set in the unlicensed band and a transmitter transmitting configuration information about the SSB burst set in the unlicensed band and transmitting information about a transmission interval in which an SSB is transmitted in the SSB burst set based on a result of the LBT.

Advantageous Effects

According to embodiments, there may be provided a method and device for performing wireless communication in an unlicensed band to minimize the transmission/reception complexity of a synchronization signal block considering the results of an LBT upon transmitting a synchronization signal block for access in an unlicensed band.

Further, according to embodiments, there may be provided a method and device for performing beam estimation and applying an LBT-based beamforming pattern in an unlicensed band.

BRIEF DESCRIPTION OF DRAWINGS

FIG. 15 is a view illustrating an example of setting an SSB indication field in an SSB burst according to an embodiment;

FIG. 25 is a view illustrating an example of application of a reference point for deriving SSB/CSI-RS-based L1-RSRP according to an embodiment;

FIG. 26 is a view illustrating an example of non-application of a reference point for deriving SSB/CSI-RS-based L1-RSRP according to an embodiment;

MODE FOR CARRYING OUT THE INVENTION

Figure 1:
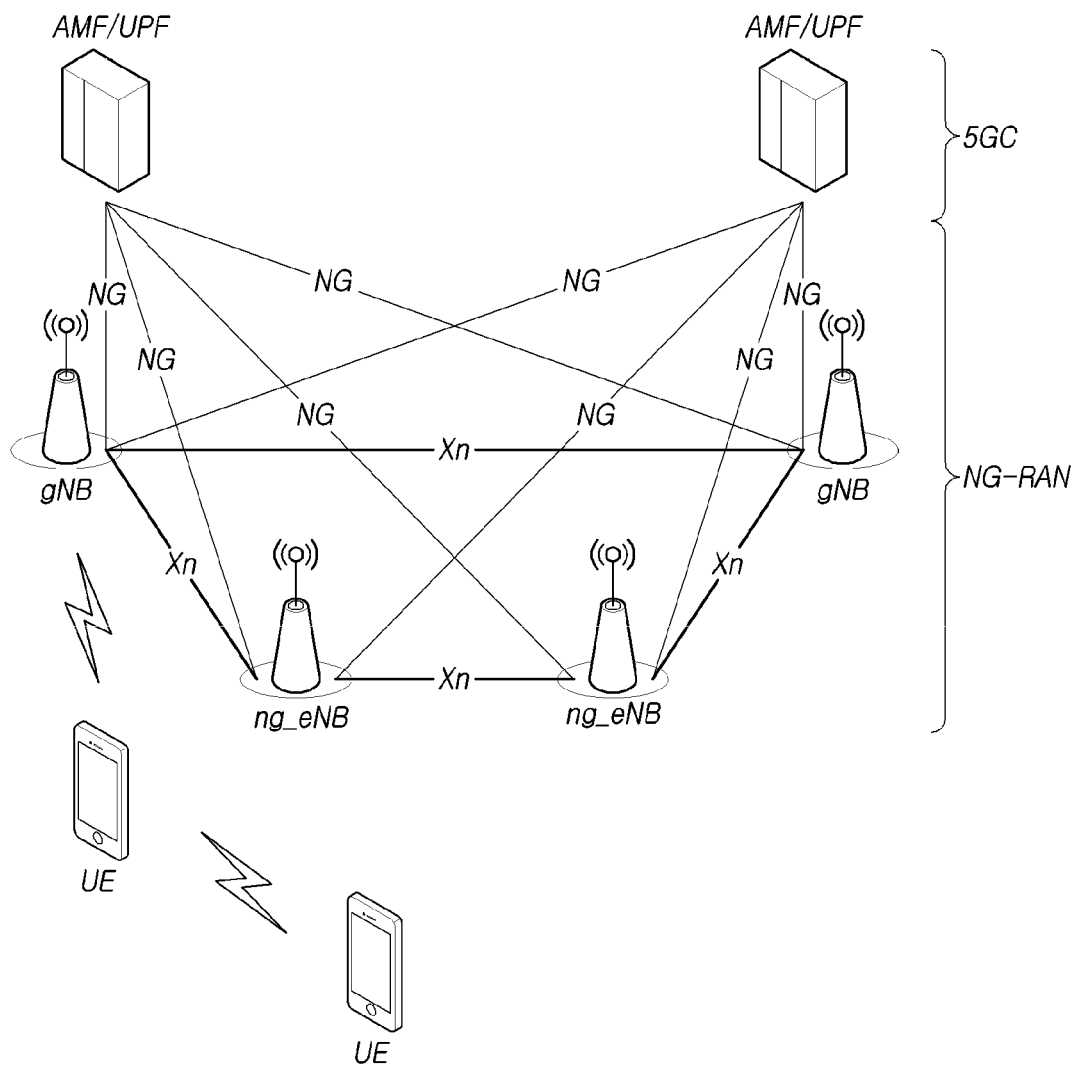
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC- FDMA), non-orthogonal multiple access (NOMA), or the like. In addition, the radio access technology may refer to respective generation communication technologies established by various communication organizations, such as 3GPP, 3GPP2, Wi-Fi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
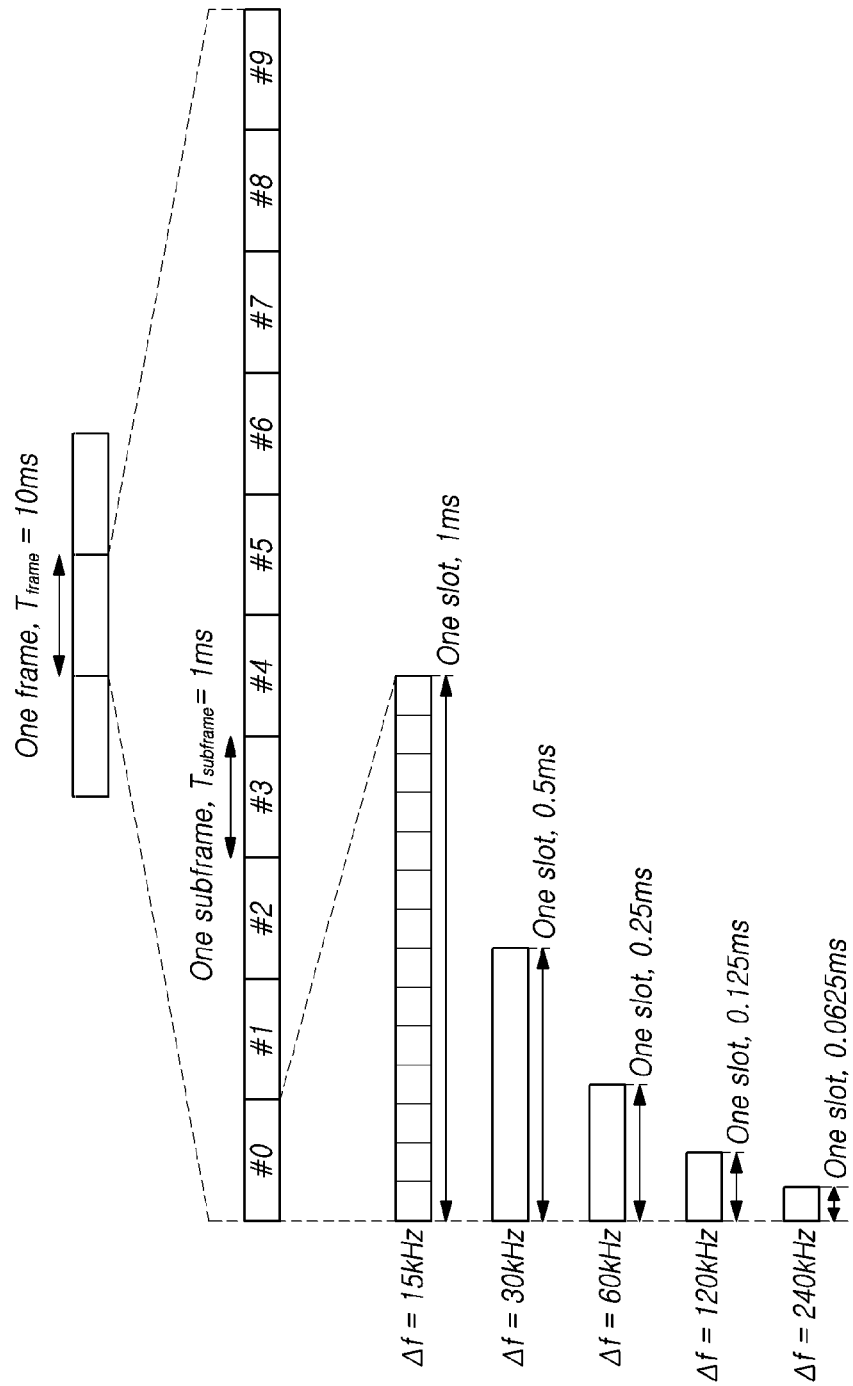
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
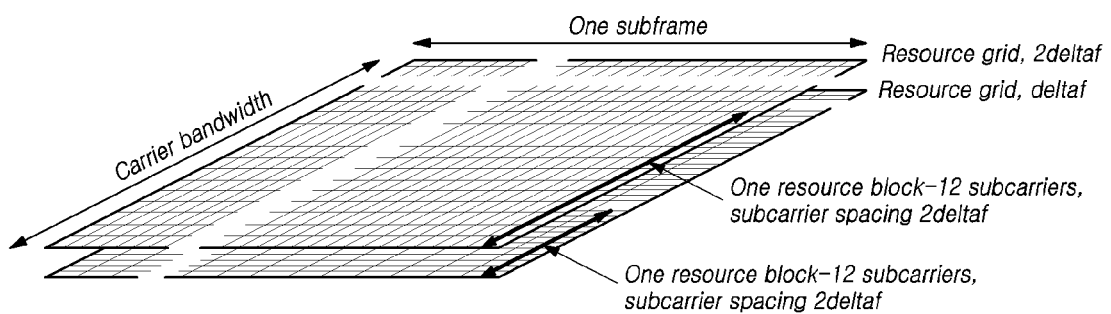
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
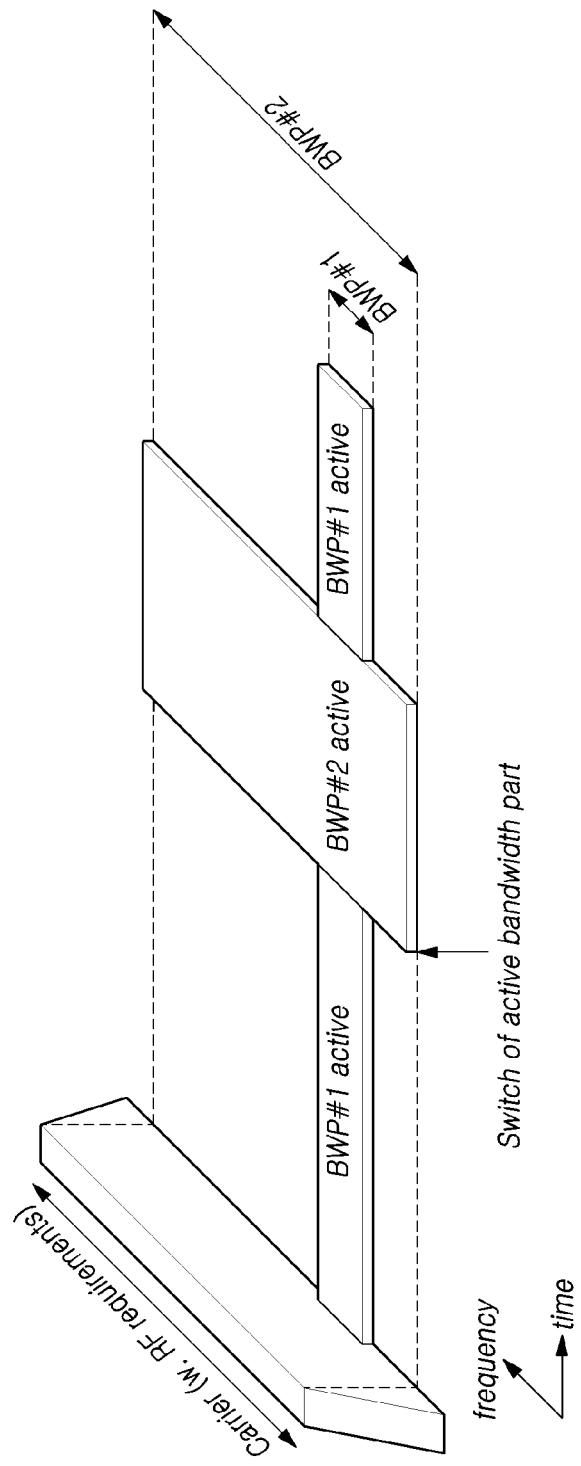
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
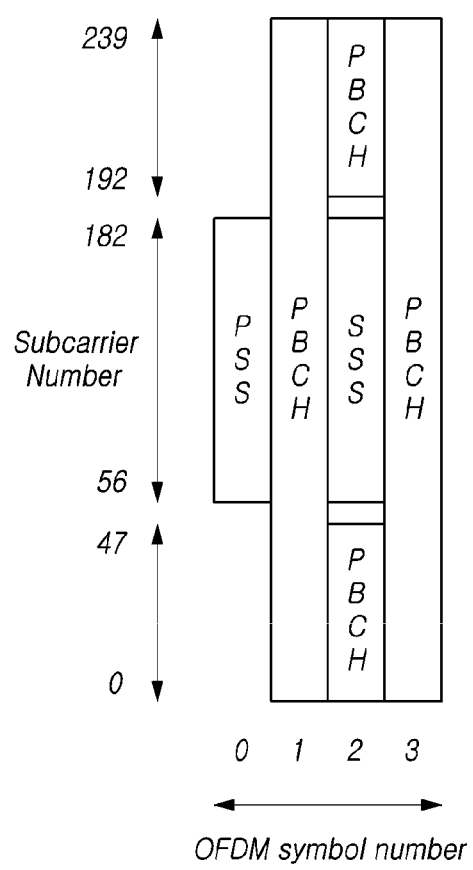
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
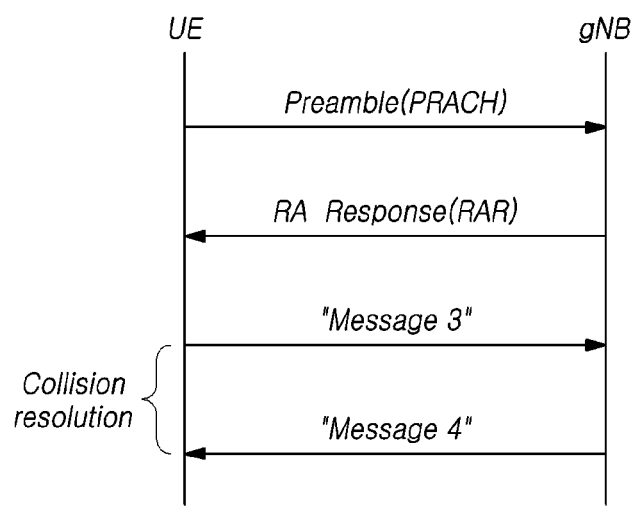
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
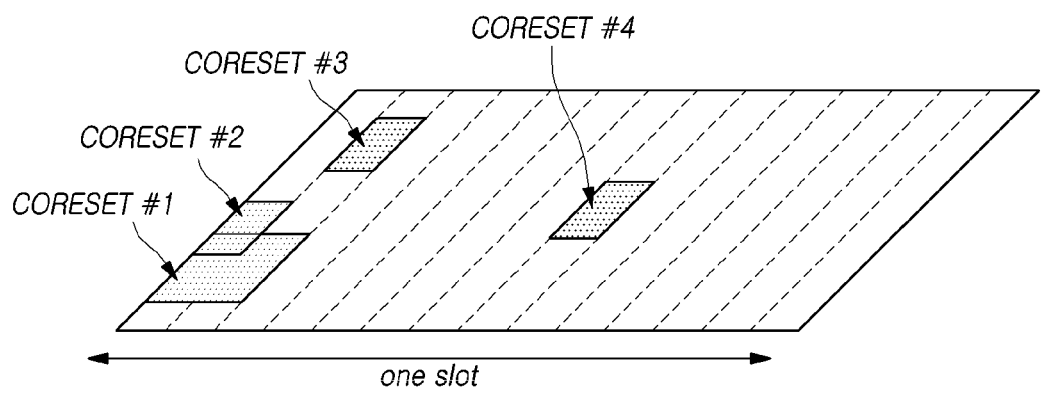
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

5G NR(New Rat)

The 3GPP supports a multiple subcarrier-based frame structure in relation to the frame structure of NR. In relation thereto, the default subcarrier spacing (SCS) is 15 kHz, and a total of five kinds of SCSs in the form of the product of 15 kHz and $2^\mu$ are supported. The SCS values according to $\mu$ are shown in Table 1 above.

Figure 8:
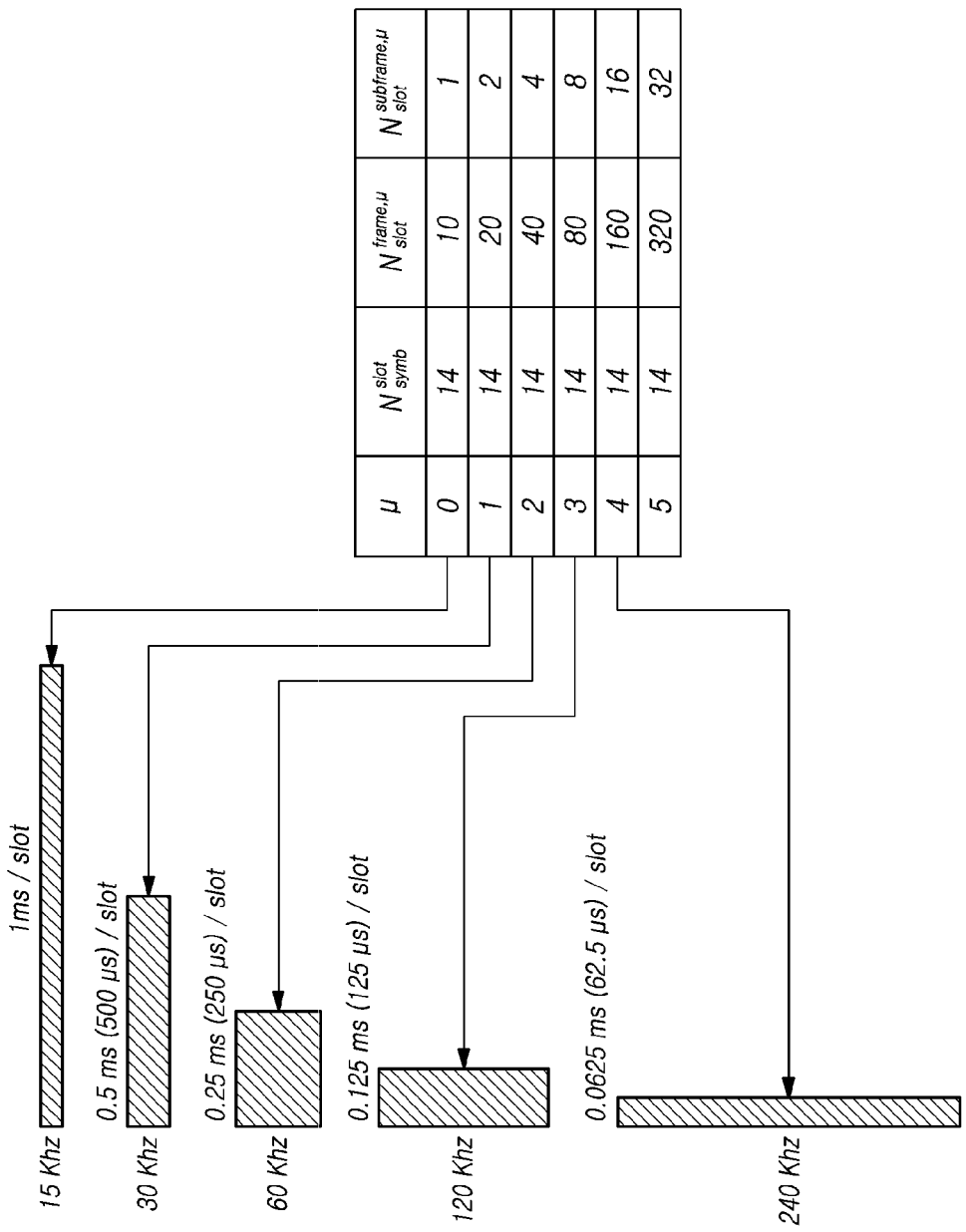
FIG. 8 is a view illustrating an example of symbol level alignment among different subcarrier spacings (SCSs) in accordance with embodiments of the present disclosure.

Referring to FIG. 8, the slot length is varied depending on the numerology. In other words, as the slot length decreases, the SCS may increase. In NR, the slot is defined based on 14 OFDM symbols.

Figure 9:
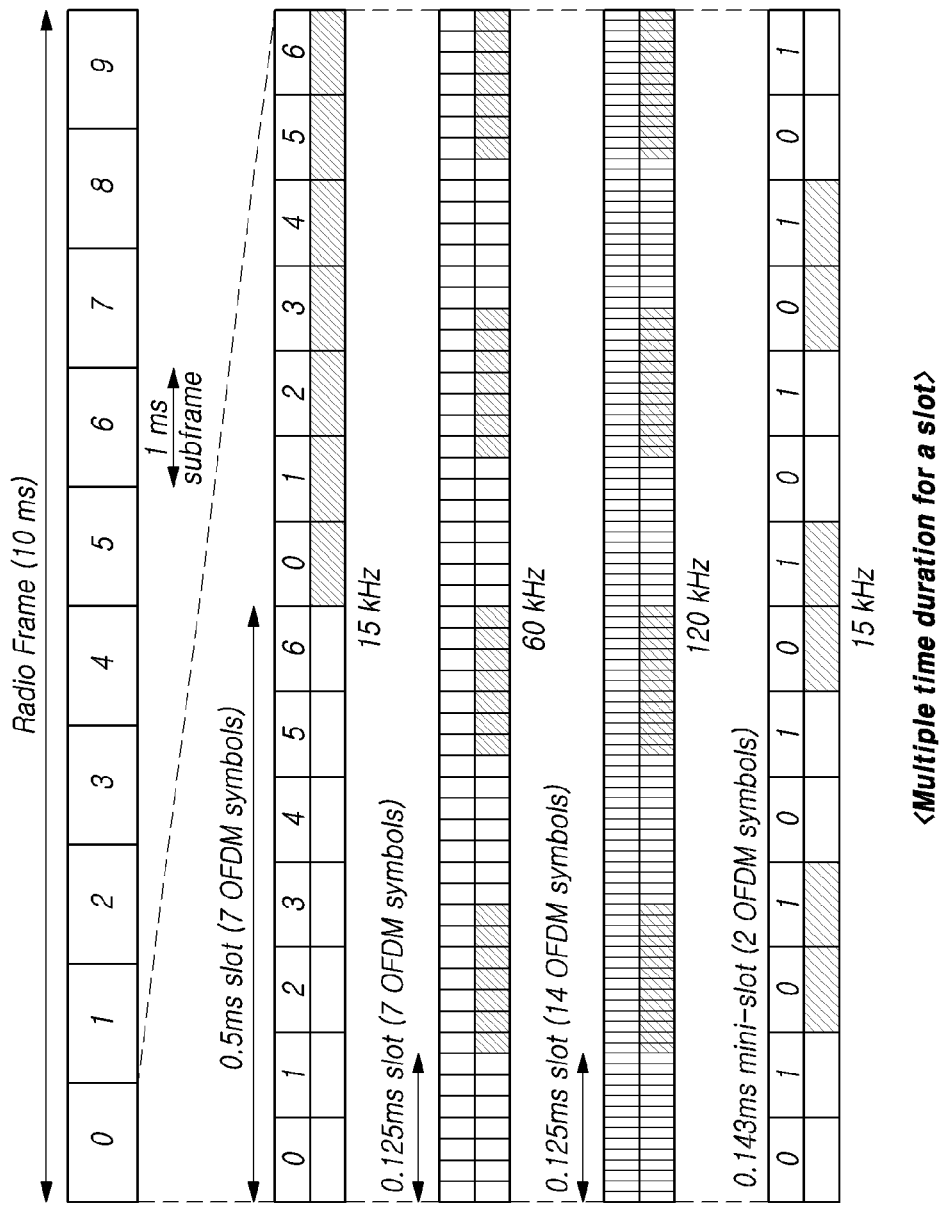
FIG. 9 is a view illustrating an NR time domain structure according to a subcarrier spacing to which an embodiment is applicable.

In NR, the following time domain structure on the time axis is supported. Unlike in legacy LTE, the default scheduling unit is changed to slot in NR. Referring to FIG. 9, the slot is configured of 14 OFDM symbols regardless of the subcarrier spacing. Further, NR also supports a non-slot structure configured of 2, 4, or 7 OFDM symbols, which is a smaller scheduling unit. The non-slot structure may be utilized as a scheduling unit for URLLC service.

The radio frame is set to 10 ms regardless of numerologies. The subframe, as a reference for time duration, is set to 1 ms. In NR, the subframe is not used in data/control scheduling units. The slot is used primarily in eMBB and includes 14 OFDM symbols. The non-slot, e.g., mini-slot, is used mainly in URLLC, but is not limited thereto, and includes 2, 4, or 7 OFDM symbols. The TTI duration is time duration for data/control channel transmission and is set to multiple OFDM symbols per slot/non-slot.

Unlicensed Band (NR-Based Access to Unlicensed Spectrum, NR-U)

Unlike the licensed band, the unlicensed band is not a radio channel that may be used exclusively by an operator but may be used by any business operator or individual to provide wireless communication services within the regulations of each country. Accordingly, when an NR service is provided through an unlicensed band, it is necessary to resolve the coexistence problem with various short-range wireless communication protocols such as Wi-Fi, Bluetooth, and NFC that are already provided through the unlicensed band and the problem with coexistence between NR operators or LTE operators.

Thus, upon providing an NR service via an unlicensed band, it is necessary to perform an LBT (Listen Before Talk)-based radio channel access method to determine whether the radio channel or carrier is available by sensing the power level of the radio channel or carrier to be used before transmitting a radio signal to avoid interference or collision between radio communication services. In this case, where a specific radio channel or carrier in the corresponding unlicensed band is being used by other radio communication protocol or other operator, the provision of NR service via the band may be limited. Thus, the wireless communication system via an unlicensed band may not guarantee the QoS required by the user, unlike the wireless communication system via a licensed band.

In particular, in contrast to legacy LTE, which supports an unlicensed spectrum necessarily via carrier aggregation (CA) with a licensed spectrum, NR-U takes into consideration stand-alone NR-U cells, NR cells of licensed band, or NR-U cells based on dual connectivity (DC) with LTE cells, as a deployment scenario of unlicensed band NR and thus requires a design for a data transmission/reception method for the unlicensed band itself to meet the minimum QoS.

NR SSB

Figure 10:
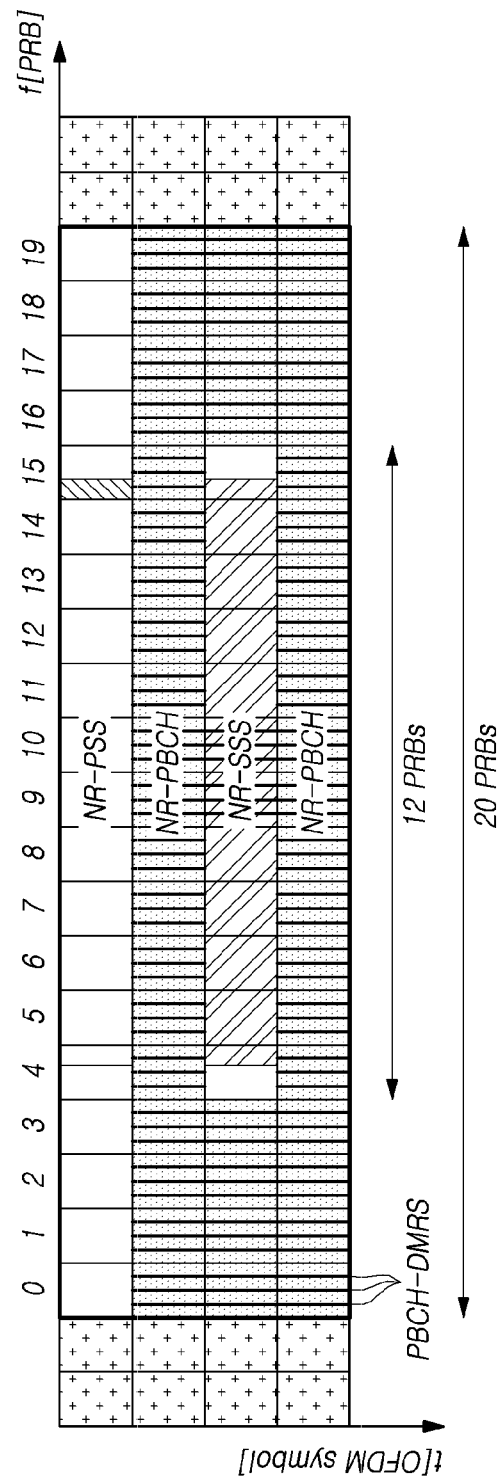
FIG. 10 is a view illustrating an NR PSS/SS/PBCH block to which an embodiment is applicable.

Referring to FIG. 10, unlike in LTE, the NR synchronization signal block (SSB) may be transmitted in various subcarrier spacings and is transmitted along with PBCH all the time. Further, the minimum transmission band required is defined per subcarrier spacing as follows.

In 6 GHz, a band with 10 MHz and a 30 kHz SCS and 15 kHZ SCS and 5 MHz, except for some specific bands, such as n41, n77, and n78, are defined. In 6 GHz or more, a 120 kHz SCS and 10 MHz are defined.

Further, a different subcarrier spacing is supported per frequency band. In 1 GHz or less, an SCS of 15 kHz, 30 kHz, or 60 kHz is supported. In a band between 1 GHz and 6 GHz, an SCS of 15 kHz, 30 kHz, or 60 kHz is supported. In 24 GHz or more and 52.6 GHz or less, an SCS of 60 kHz or 120 kHz is supported. Further, 240 kHz does not apply to data.

Figure 11:
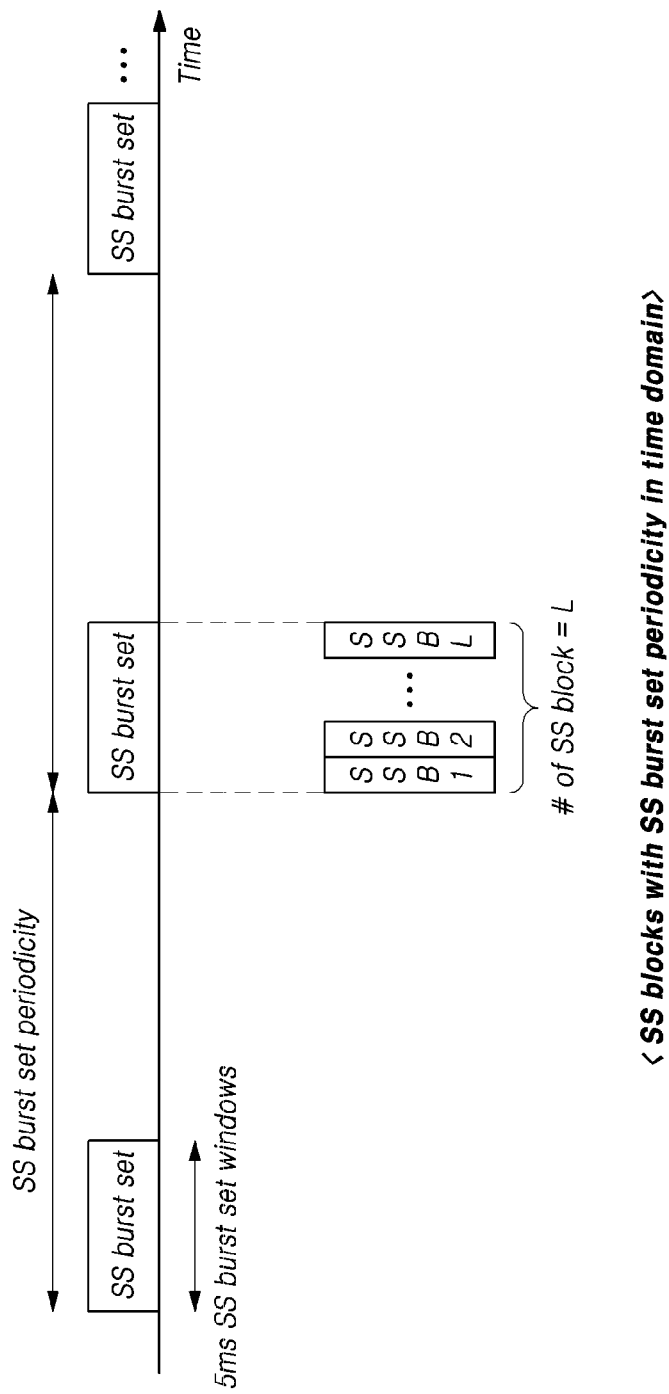
FIG. 11 is a view illustrating an SSB burst periodicity to which an embodiment is applicable.

Referring to FIG. 11, an SSB is defined as an SSB burst set, rather than a single form, and is transmitted. Basically, the SSB burst set is 5 ms regardless of numerology, and the maximum number L of SSB blocks which may be transmitted in the set is as follows.

For the frequency range up to 3 GHz, L is set to 4. For the frequency range from 3 GHz to 6 GHz, L is set to 8. For the frequency range from 6 GHz to 52.6 HGz, L is set to 64.

The periodicity of transmission of the defined SSB burst set is additionally set by RRC and indicated to the UE. The UE performing initial access assumes a periodicity of 20 ms as default. After obtaining synchronization, the UE performs a system information update. Thereafter, the SSB burst periodicity value is finally updated by the base station.

NR L1-RSRP

For beam estimation, NR basically uses layer 1 reference signal receiver power (L1-RSRP) or beam resource indicator. Here, beam resource indicator means CSI-RS resource indicator (CRI) or SSB index.

SSB-based beam estimation estimates L1-RSRP via SSB resources configured via higher layer signaling. CSI-RS also performs linear averaging for one or two ports among configured CSI-RS resources for L1-RSRP estimation. Resultantly, the L1-RSRP value estimated via SSB and CSI-RS resources by the UE is reported to the gNB via the selected SSB index or CRI. The period and reporting value settings for beam reporting are as follows.

L1-RSRP and/or beam resource indicators (e.g. CRI or SSB index)

Short/long PUCCH or PUSCH

Periodic: Using short/long PUCCH

ReportPeriodicity: {5, 10, 20, 40, 80, 160, 320}.

Semi-persistent: Using short/long PUCCH and DCI activated PUSCH

ReportPeriodicity: {5, 10, 20, 40, 80, 160, 320}.

Aperiodic: Using PUSCH

L1-RSRP

Max. 4 beams in one instance for non-group based beam reporting

The strongest reported RSRP(7 bits, 1 dB): range [−144, −44] dBm

Differential RSRP(4 bits, 2 dB quantization) with reference to the strongest reported RSRP Reporting configurations is configured as follows if the UE is configured with the high layer parameter ReportQuantity as 'CRI/RSRP'.

If the UE is configured with the higher layer parameter group-based-beam-reporting as 'OFF,' the UE need not update more measurements than 64 [CSI-RS and/or SSB] resources and, for each report setting, the UE may report nrofReportedRS (higher layer configured) different [CRI and SSBRI(SSB Resource Indicator)] as a single report. If the high layer parameter nrofReportedRS is set to 1, the reported L1-RSRP value is defined as a 7-bit value in the range of [−140, −44] dBm as a 1 db step size. If the high layer parameter nrofReportedRS is set to be larger than 1, the UE needs to use the largest L1-RSRP and differential L1-RSRP-based reporting and uses a 7-bit value as the maximum L1-RSRP value and a 4-bit value as the differential L1-RSRP. The differential L1-RSRP value is calculated as a 2 db step size by referring to the maximum L1-RSRP value which is part of the same L1-RSRP reporting instance.

If, in the UE, the high layer parameter group-based-beam-reporting set to 'ON,' the UE may report number-of-beams-reporting L1-RSRP and CSI report in a single reporting instance and may use one spatial domain reception filter or multiple simultaneous spatial domain reception filters to simultaneously receive number-of-beams-reporting [CSI-RS and or SSB] resources.

For L1-RSRP calculation, the UE may be configured with the CSI-RS resource, SS/PBCH resource or CSI-RS and SS/PBCH block resource. The UE may be configured with CSI-RS resources configuring up to 16 CSI-RS resource sets each having up to 64 resources/In all the resource sets, the total number of different CSI-RS resources does not exceed 128.

NR-U considers a stand-alone design for an unlicensed band. Thus, although the gNB transmits a synchronization signal, the synchronization signal may not be transmitted at a desired time since an LBT needs to be performed. Further, if synchronization signals are transmitted in all the synchronization signal candidates, frequency efficiency may decrease and the UE's SSB detection complexity may increase and, thus, an appropriate solution may be required to address such issues. Further, beam estimation requires SSB or CSI-RS resources transmitted in predetermined positions. However, since NR-U determines whether to transmit memory RS according to an LBT result, it is impossible to always perform expected beam estimation.

Hereinafter, a method of transmitting an SSB considering an LBT result in an unlicensed band and a method for LBT-based beam estimation will be described with reference to the accompanying drawings.

Figure 12:
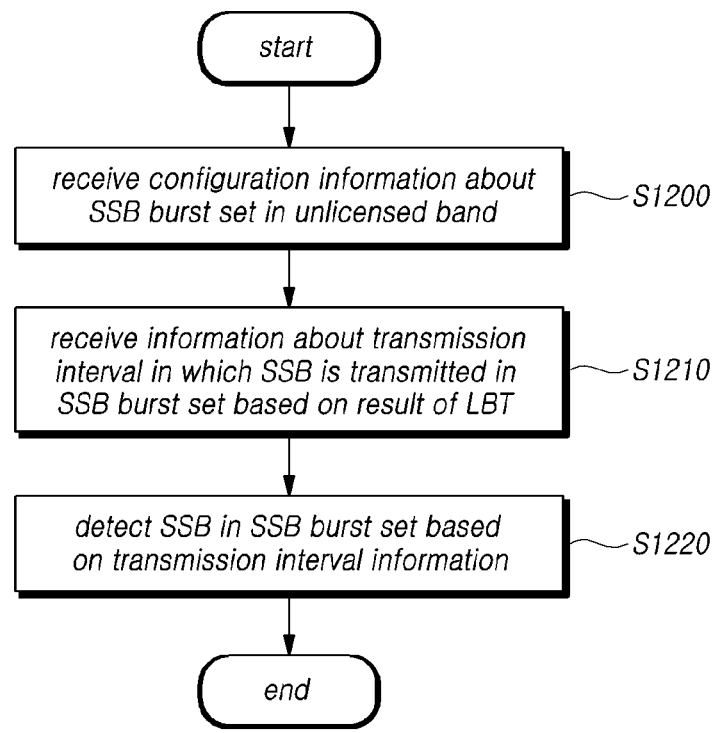
FIG. 12 is a flowchart illustrating a procedure of performing wireless communication in an unlicensed band by a UE according to an embodiment.

FIG. 12 is a flowchart illustrating a procedure of performing wireless communication in an unlicensed band by a UE according to an embodiment.

Referring to FIG. 12, the UE may receive configuration information about a synchronization signal block (SSB) burst set in an unlicensed band (S1200).

As described above, an SSB is defined as an SSB burst set, rather than a single form, and is transmitted. Upon performing initial access in an unlicensed band, the UE may receive configuration information for the SSB burst set for receiving the SSB from the base station. The configuration information may include information about, e.g., SSB burst set period information or continuous interval.

Hereinafter, as an example, it is hypothesized that the number of SSBs in the SSB burst set at 15 kHz SCS is 8. Since SSB transmission occurs two times in total in one slot, SSB transmission positions may be configured in four slots in the SSB burst.

Referring back to FIG. 12, the UE may receive information about the transmission interval in which the SSB is transmitted in the SSB burst set based on the result of listen before talk (LBT) for the unlicensed band (S1210).

For any node to transmit a radio signal in an unlicensed band, an LBT needs to be performed to identify whether the corresponding radio channel is occupied by another node. Thus, an LBT needs to be performed for the corresponding unlicensed band to perform SSB transmission in the NR-U cell in the unlicensed band configured by any NR base station. Where the radio channel in the corresponding unlicensed band is empty as a result of performing the LBT, the base station may transmit the SSB via the radio channel of the unlicensed band.

Thus, the SSB is transmitted always at a predetermined time and may not be transmitted in a slot configured in the unlicensed band. Thus, if LBT fails, transmission interval information for indicating the SSB index, in which the SSB is transmitted in the SSB burst set, may be configured.

For example, it is hypothesized that for four slots in the SSB burst, the SSB indexes where SSB transmission is possible are set to #0 to #7. That is, in the first half of the first slot, SSB_index=0 and, in the last half, SSB_index=1. Likewise, in the first half of the second slot, SSB_index=2 and, in the last half, SSB_index=3. Sequentially, in the first half of the third slot, SSB_index=4 and, in the last half, SSB_index=5, and in the first half of the fourth slot, SSB_index=6 and, in the last half, SSB_index=7.

For example, according to the initial configuration, such an SSB transmission pattern may be configured in which the SSB is transmitted at SSB_index=0 in the first half of the first slot and SSB_index=4 positioned in the first half of the third slot, and it may be transmitted to the UE. In this case, the UE may perform actual synchronization signal detection at SSB_index=0 and SSB_index=4. However, since in the unlicensed band, the base station performs an LBT upon actual SSB transmission and, after LBT succeeds, SSB transmission is performed, SSB transmission at the initially set time may not be guaranteed. Accordingly, information about the transmission interval in which the SSB is transmitted may be transmitted to the UE in the SSB burst set including the information about a change in the SSB transmission position due to LBT failure.

The transmission interval information may include SSB_index information at which LBT succeeds in the SSB burst set and SSB is actually transmitted. In this case, as an example, the arrangement of SSB indexes where the SSB is actually transmitted may be flexibly configured in multiple patterns, and a pattern selected by a predetermined criterion may apply. Or, as an example, the SSB_index where the SSB is actually transmitted may be indicated via RRC signaling or RMSI.

As another example, the transmission interval information for SSB transmission in the SSB burst set may include cyclic pattern information for transmitting the SSB, which has not been transmitted at the SSB_index where LBT failed, after the SSB transmitted at the SSB index where LBT succeeds, in the SSB burst set. For example, it is hypothesized that the SSB transmission positions set via higher layer signaling are SSB_index #0 to #3. Where LBT succeeds at SSB_index #2, consecutive transmission of SSBs may be performed at SSB_index #2 to #5.

As such, if the SSB transmission position is changed, application of a beamforming pattern for SSB transmission may be set as follows. In other words, in NR, the gNB may transmit SSBs always at predetermined times. Accordingly, different beamforming may apply to each SSB in the SSB burst set and, even in the next period of SSB burst set, such beam application may be set to be repeated. However, since beam transmission is performed after LBT in NR-U, it is not guaranteed to transmit an SSB always in a predetermined position. Accordingly, a configuration of beam transmission for the case where it is impossible to transmit SSBs always in predetermined positions may be taken into consideration in NR-U.

In the above-described example, unlike the initial settings, if consecutive SSB transmission is performed at SSB_index #2 to #5, additional settings are needed since no beam setting has been made for #4 and #5. Accordingly, upon SSB consecutive transmission, beam mapping for all the SSB indexes may be performed in the form of a cyclic pattern for the initially set beam pattern for the SSBs in the SSB burst. The cyclic pattern form may be previously defined and, given the SSB density of actual transmission in the SSB burst, the pattern may be determined. For example, the beam pattern set for SSB_index #0 and #1 may be applicable to SSB_index #4 and #5.

As another example, information about the interval for transmitting the SSB in the SSB burst set may include shift value information indicating the SSB_index of additionally transmitting the SSB in the SSB burst set. For example, for the SSB burst set, an N_shift value considering an additional shift pattern, along with single SSB indication information for the SSB index for transmitting the SSB may further be designated. For example, if 'N_shift'=2 is given, SSB detection for the pattern in which it has been+2 moved from the existing position may be attempted. Accordingly, if LBT fails in the corresponding position, a chance of additional transmission of the SSB may be provided depending on whether LBT succeeds in the very subsequent interval.

In this case, if the SSB indication information first transferred by RRC is set to N_shift=2, the UE may basically detect the SSB_index provided by the shift pattern, in addition to the SSB detection range by the existing SSB indication information.

Referring back to FIG. 12, the UE may detect the SSB in the SSB burst set based on the transmission interval information (S1220).

The transmission interval information including the SSB_index where the SSB is transmitted in the SSB burst set may be indicated via RRC signaling or RMSI. The UE may detect the SSB in the slot corresponding to the SSB index where the SSB is transmitted in the SSB burst set, based on the transmission interval information. That is, the UE may detect the SSB even in a position different from the initially set position, depending on the result of LBT. The UE may obtain synchronization and update system information based on the detected SSB.

According to the embodiments described above, there may be provided a method and device for performing wireless communication in an unlicensed band to minimize the transmission/reception complexity of a synchronization signal block considering the results of an LBT upon transmitting a synchronization signal block for access in an unlicensed band. Further, there may be provided a method and device for performing beam estimation and applying an LBT-based beamforming pattern in an unlicensed band.

Figure 13:
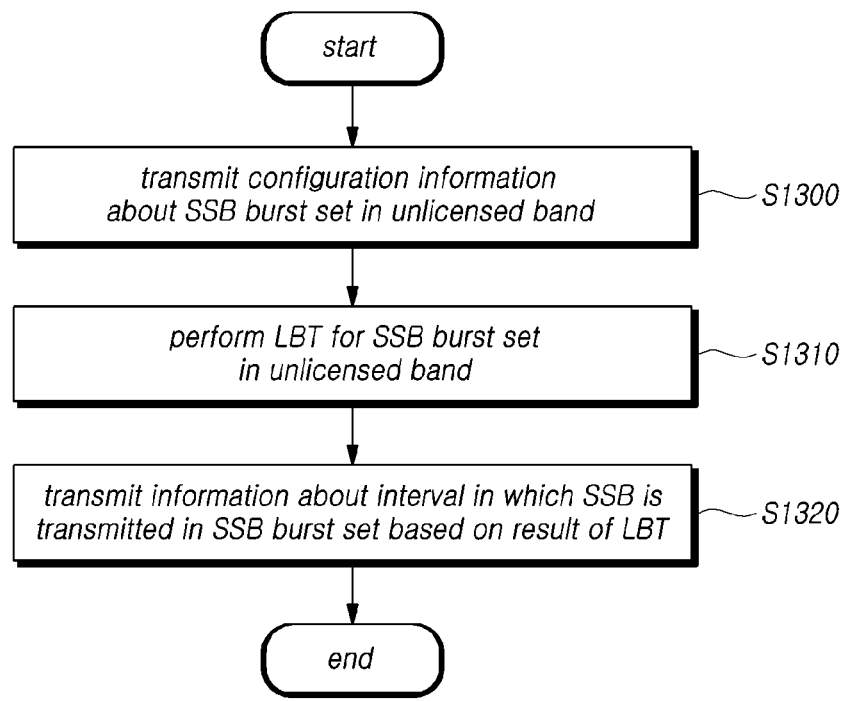
FIG. 13 is a flowchart illustrating a procedure of performing wireless communication in an unlicensed band by a base station according to an embodiment.

FIG. 13 is a flowchart illustrating a procedure of performing wireless communication in an unlicensed band by a base station according to an embodiment.

Referring to FIG. 13, the base station may transmit configuration information about a synchronization signal block (SSB) burst set in an unlicensed band (S1300).

An SSB is defined as an SSB burst set, rather than a single form, and is transmitted. For performing initial access in an unlicensed band of the UE, the base station may transmit configuration information for the SSB burst set for transmitting the SSB. The configuration information may include information about, e.g., SSB burst set period information or continuous interval.

Referring back to FIG. 13, the base station may perform a listen before talk (LBT) operation for the SSB burst set in the unlicensed band (S1310).

For any node to transmit a radio signal in an unlicensed band, an LBT needs to be performed to identify whether the corresponding radio channel is occupied by another node. Thus, an LBT needs to be performed for the corresponding unlicensed band to perform SSB transmission in the NR-U cell in the unlicensed band configured by any NR base station. Where the radio channel in the corresponding unlicensed band is empty as a result of performing the LBT, the base station may transmit the SSB via the radio channel of the unlicensed band.

For example, it is assumed that for four slots in the SSB burst, the SSB indexes where SSB transmission is possible are set to #0 to #7. That is, in the first half of the first slot, SSB_index=0 and, in the last half, SSB_index=1. Likewise, in the first half of the second slot, SSB_index=2 and, in the last half, SSB_index=3. Sequentially, in the first half of the third slot, SSB_index=4 and, in the last half, SSB_index=5, and in the first half of the fourth slot, SSB_index=6 and, in the last half, SSB_index=7.

For example, if according to the initial configuration, such an SSB transmission pattern may be configured in which the SSB is transmitted at SSB_index=0 in the first half of the first slot and SSB_index=4 positioned in the first half of the third slot, the base station may perform an LBT for SSB_index=0. If the LBT succeeds, the base station may transmit the SSBs from SSB_index=0, according to the predetermined pattern, for the corresponding unlicensed band, according to the initial settings. However, if the LBT fails, the base station may not perform SSB transmission from SSB_index=0, according to the initial settings.

Referring back to FIG. 13, the base station may transmit information about the transmission interval for transmitting the SSB in the SSB burst set based on the result of LBT (S1320).

That is, since in the unlicensed band, the base station performs an LBT operation upon actual SSB transmission and, after LBT succeeds, SSB transmission is performed, SSB transmission at the initially set time may not be guaranteed. Accordingly, information about the transmission interval for transmitting the SSB may be transmitted to the UE in the SSB burst set including the information about a change in the SSB transmission position due to LBT failure.

The transmission interval information may include SSB_index information at which LBT succeeds in the SSB burst set and SSB is actually transmitted. In this case, as an example, the arrangement of SSB indexes where the SSB is actually transmitted may be flexibly configured in multiple patterns, and a pattern selected by a predetermined criterion may apply. Or, as an example, the SSB_index where the SSB is actually transmitted may be indicated via RRC signaling or RMSI.

As another example, the transmission interval information for SSB transmission in the SSB burst set may include cyclic pattern information for transmitting the SSB, which has not been transmitted at the SSB_index where LBT failed, after the SSB transmitted at the SSB index where LBT succeeds, in the SSB burst set. For example, it is assumed that the SSB transmission positions set via higher layer signaling are SSB_index #0 to #3. Where LBT succeeds at SSB_index #2, consecutive transmission of SSBs may be performed at SSB_index #2 to #5.

As such, if the SSB transmission position is changed, application of a beamforming pattern for SSB transmission may be set as follows. In other words, in NR, the gNB may transmit SSBs always at predetermined times. Accordingly, different beamforming may apply to each SSB in the SSB burst set and, even in the next period of SSB burst set, such beam application may be set to be repeated. However, since beam transmission is performed after LBT in NR-U, it is not guaranteed to transmit an SSB always in a predetermined position. Accordingly, a configuration of beam transmission for the case where it is impossible to transmit SSBs always in predetermined positions may be taken into consideration in NR-U.

In the above-described example, unlike the initial settings, if consecutive SSB transmission is performed at SSB_index #2 to #5, additional settings are needed since no beam setting has been made for SSB_index #4 and #5. Accordingly, upon SSB consecutive transmission, beam mapping for all the SSB indexes may be performed in the form of a cyclic pattern for the initially set beam pattern for the SSBs in the SSB burst. The cyclic pattern form may be previously defined and, given the SSB density of actual transmission in the SSB burst, the pattern may be determined. For example, the beam pattern set for SSB_index #0 and #1 may be applicable to SSB_index #4 and #5.

As another example, information about the interval for transmitting the SSB in the SSB burst set may include shift value information indicating the SSB_index where the SSB is additionally transmitted in the SSB burst set. For example, for the SSB burst set, an N_shift value considering an additional shift pattern, along with single SSB indication information for the SSB_index where the SSB is transmitted, may further be designated. For example, if 'N_shift'=2 is given, SSB detection for the pattern in which it has been+2 moved from the existing position may be attempted. Accordingly, if LBT fails in the corresponding position, a chance of additional transmission of the SSB may be provided depending on whether LBT succeeds in the very subsequent interval.

In this case, if the SSB indication information first transferred by RRC is set to N_shift=2, the UE may basically detect the SSB_index provided by the shift pattern, in addition to the SSB detection range by the existing SSB indication information.

The transmission interval information including the SSB_index for transmitting the SSB in the SSB burst set may be indicated via RRC signaling or RMSI. The UE may detect the SSB in the slot corresponding to the SSB_index for transmitting the SSB in the SSB burst set, based on the transmission interval information. That is, the UE may detect the SSB even in a position different from the initially set position, depending on the result of LBT. The UE may obtain synchronization and update system information based on the detected SSB.

According to the embodiments described above, there may be provided a method and device for performing wireless communication in an unlicensed band to minimize the transmission/reception complexity of a synchronization signal block considering the results of an LBT upon transmitting a synchronization signal block for access in an unlicensed band. Further, there may be provided a specific method and device for performing beam estimation and applying an LBT-based beamforming pattern in an unlicensed band.

Hereinafter, each embodiment for transmitting a synchronization signal block for access to an unlicensed band will be described in detail with reference to the relevant drawings.

Currently in NR, Rel-16 Study Item, called 'NR-based Access to Unlicensed Spectrum,' is in progress. In relation to initial access for NR-U, NR-U needs to fetch a signal including, at least, SS/PBCH block burst set transmission.

The following modifications are useful for the initial access procedure. As a modification to the initial access procedure considering restrictions to channel access based on LBT, there is a demand for developing technology for processing RMSI transmission chance and SS/PBCH blocks reduced due to LBT failure. Further, there may be required a mechanism for processing, by 4-step RACH enhancement, the msg 1/2/3/4 transmission chances reduced due to LBT failure. Further, the 2-step RACH has potential advantages in channel access.

The disclosure introduces an NR-U SSB transmission structure allowing the NR SSB transmission structure to be reused without a change as possible. Basically, in NR-U, listen before talk (LBT) is performed to provide coexistence with Wi-Fi devices. That is, for any node to transmit a radio signal in an unlicensed band, an LBT needs to be performed to identify whether the corresponding radio channel is occupied by another node. Thus, an LBT operation needs to be performed for the corresponding unlicensed band to perform SSB transmission in the NR-U cell in the unlicensed band configured by any NR base station. Where the radio channel in the corresponding unlicensed band is empty as a result of performing the LBT operation, the base station may transmit the SSB via the radio channel of the unlicensed band.

Thus, the SSB which is transmitted always at a predetermined time may not be transmitted in a desired slot in the stand-alone mode of NR-U. The UE performs basic initial access mode by receiving the SSB and RMSI upon initial access but, upon failing to detect the synchronization signal, even cell access may be rendered impossible. The disclosure introduces relevant embodiments as follow.

Embodiment 1. Multiple SSB Transmission Pattern Information May be Configured and the Corresponding Information May be Indicated to the UE In NR, the SSB_index where actual transmission is performed in the SSB burst set for SSB transmission may be indicated. The indication of the SSB_index may be transmitted in bitmap. As a signaling mode for the same, it may be indicated via an RMSI in idle mode and via an RRC in connected mode.

Figure 14:
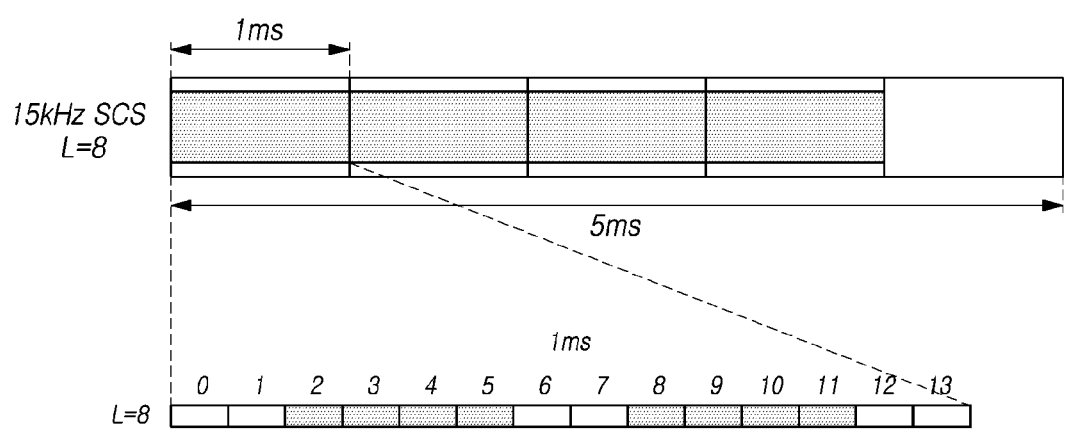
FIG. 14 is a view illustrating an example of setting an SSB transmission position in an SSB burst according to an embodiment.

For example, it is assumed that the number (L) of SSBs in the SSB burst set is 8 at 15 kHz SCS as shown in FIG. 14. In this case, since SSB transmission may occur two times in total in one slot, all the SSB transmission positions may be set in four slots. Further, information about the actual position for transmitting the SSB may be indicated to the UE by the gNB via signaling.

For example, it is assumed that the UE receives the bitmap L=[10001000]. Since in the bitmap, two bits correspond to the SSB transmission position in one slot, it may be indicated that the SSB is actually transmitted at SSB_index=0 positioned in the first half of the first slot among the four slots and SSB_index=4 positioned in the first half of the third slot. Thus, the UE may perform actual synchronization signal detection at SSB_index=0 and SSB_index=4. In legacy NR, such operation is possible. However, in NR-U, since the gNB performs an LBT upon actual SSB transmission and, after LBT succeeds, SSB transmission is performed, SSB transmission at the original time may not be guaranteed.

Thus, as an example, multiple SSB indication fields for NR-U may be defined, and the corresponding information may be indicated to the UE. For example, in NR-U, multiple SSB transmission patterns in the SSB burst set may be indicated to the UE as shown in FIG. 15.

As described above, in NR-U, an LBT is performed for SSB transmission. Accordingly, according to an embodiment, upon failing in LBT in SSB indication pattern-1, the gNB may again perform an LBT based on SSB indication pattern-2. That is, in the example shown in FIG. 15, when the LBT attempted only at SSB_index #0 and #4 fails, an LBT may be performed at SSB_index #2 and #6.

Figure 16:
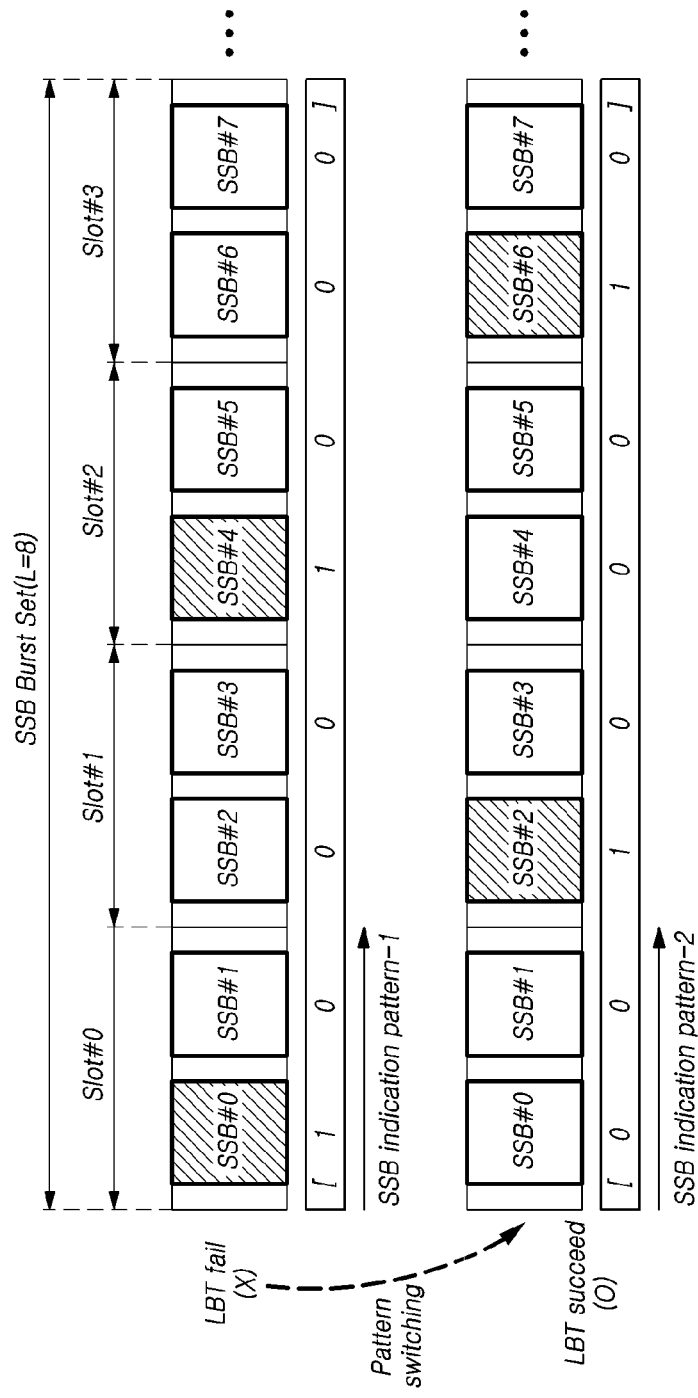
FIG. 16 is a view illustrating an example of switching of an SSB indication pattern based on LBT, according to an embodiment.

Resultantly, as shown in FIG. 16, since the gNB has already configured the multiple SSB indication patterns in the UE, if an LBT is performed in SSB indication pattern-1 and fails, it may switch to SSB indication pattern-2, and an LBT may be performed. If the LBT succeeds, SSB transmission may be consecutively performed in SSB indication pattern-2, not in the first pattern, i.e., SSB indication pattern-1. The same operation may apply even when the LBT fails in SSB indication pattern-2 and a switch occurs to SSB indication pattern-1.

Embodiment 1-1. The UE May Selectively Operate the Pattern in which SSB Detection has Succeeded Based on Multiple SSB Indication Patterns As in the above-described embodiment 1, it is assumed that the UE may obtain the multiple SSB indication pattern based on system information. In this case, the gNB may switch SSB indication patterns depending on the result of LBT. Thus, the UE may perform SSB detection as follows.

As an example, before initial access or receiving SSB indication information, the UE may perform SSB detection in all the SSB transmission intervals in the SSB burst set. Accordingly, the complexity of the initial SSB detection is shown as the highest. Thereafter, the UE may detect the SSB for multiple SSB indication patterns according to the SSB indication information. Further, the UE may proceed with SSB detection under the assumption of the SSB pattern including the first SSB_index where the SSB is normally detected. Further, upon failing to detect the SSB in the existing SSB indication pattern position, the UE may perform SSB detection on the other patterns and may change to the SSB indication pattern including the SSB index newly detected. Further, the SSB indexes basically individually included in the SSB indication patterns may be set not to overlap each other. However, this is merely an example, and without limitations thereto, the SSB indexes may overlap in some intervals.

As another example, in the case of a change in SSB position, upon failing to detect the SSB in the existing SSB indication pattern position, the UE may perform SSB detection on the other patterns and may change to the SSB indication pattern including the SSB index newly detected.

Embodiment 1-2. The gNB May Change Multiple SSB Indication Patterns Via Signaling As an example, RRC information may be configured for the SSB indication pattern and be transferred to the UE. Basically, the gNB may configure multiple SSB indication patterns. However, it may not operate in the mode using the multiple SSB indication patterns from the beginning. For example, initially, it may use single SSB indication information like in legacy NR. Thereafter, if LBT failures increases so that more chances may not be obtained in SSB transmission, it may be operated in the corresponding mode. Thus, in such a case, multiple SSB indication pattern configuration information as shown in FIG. 15 may be indicated to the UE. Methods for defining multiple SSB indication pattern information according thereto may be classified as follows.

As an example, if multiple patterns are directly defined, the size of the bitmap that the gNB needs to transmit to the UE increases in proportion to the number of the multiple patterns. For example, the total number of pieces of information necessary for designating N patterns for SSB burst set L=8 becomes L×N. Accordingly, example pattern information may be configured as, Pattern-1: [10001000], Pattern-2: [01000100], Pattern-3: or [00100010].

As another example, if multiple patterns are defined based on offset, the gNB may transmit only the offset between patterns based on the first bitmap defined to the UE. In this case, as compared with when multiple patterns are directly defined, the number of pieces of information may be reduced, but the flexibility of SSB indication may be lowered. Accordingly, example pattern information may be configured as, Pattern-1: [10001000], Pattern-2: offset=1→[01000100], Pattern-3: or offset=2→[00100010].

Embodiment 2. The gNB May Configure Detection Range Information in the UE in Addition to the SSB Indication Pattern According to the above-described embodiment 1, the gNB may provide a chance of performing an LBT to be able to perform SSB transmission as fast as possible although an LBT fails via configuration of multiple SSB indication patterns. Further, a method for transferring information about multiple patterns to the UE has been described in connection with embodiment 1.

Unlike what has been described above, in embodiment 2, a single SSB indication information/pattern may be provided like in legacy NR. Together with this, a range value related to SSB detection may be additionally designated. For example, if the value 'N_add'=1 is provided, the UE may attempt SSB detection for the SSB indexes in the range of the existing position+1. Accordingly, if LBT fails in the corresponding position, a chance of additional transmission of the SSB may be provided depending on whether LBT succeeds in the very subsequent interval. The 'N_add' value set at this time may be defined in, e.g., + direction, − direction, or ±direction.

Figure 17:
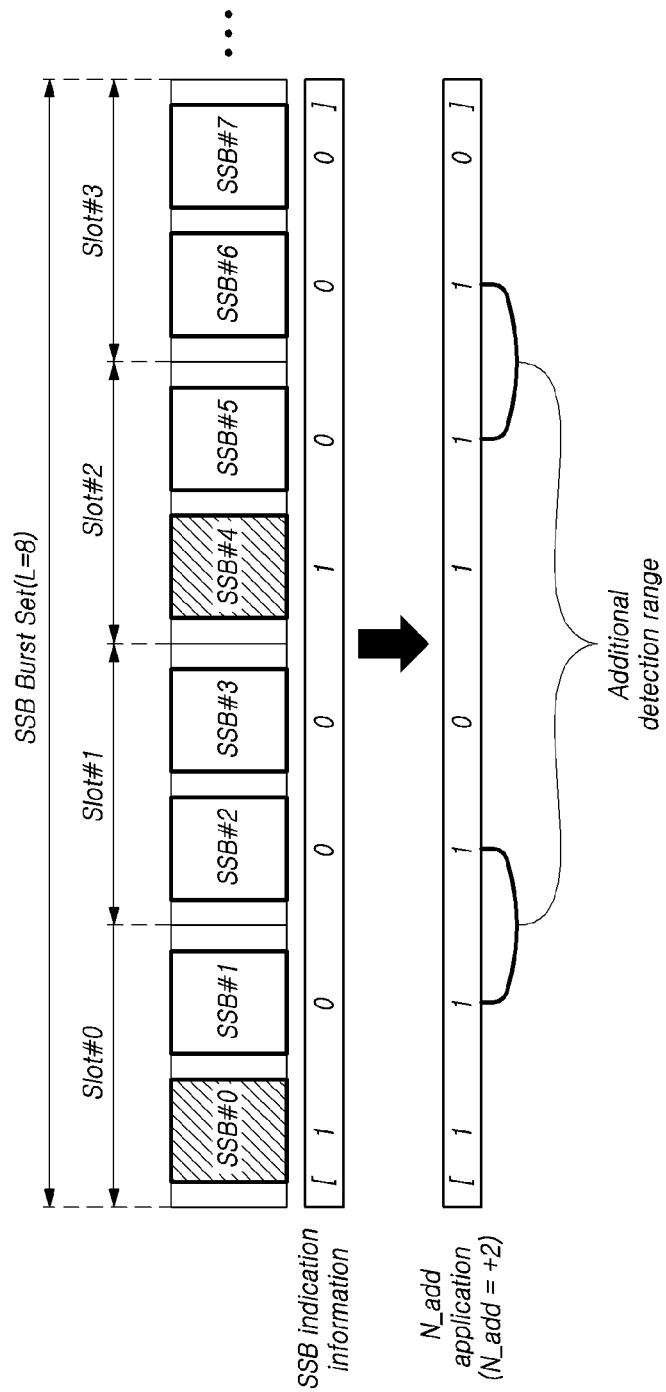
FIGS. 17 to 19 are views illustrating an example of configuring additional detection range information for an SSB according to an embodiment.

As an example, it is assumed that the N_add value is a positive value, and the existing SSB indication information (L=8) is [10001000]. For example, if N_add is set to +2, the first UE detection attempt SSB_index becomes [0,4], in relation to the SSB_index range where the UE is to perform detection, as shown in FIG. 17. Thereafter, if the N_add value is applied, SSB detection may be performed at the SSB indexes of [0, 1, 2, 4, 5, 6]. That is, SSB_indexes positioned within the range of +2 including the existing SSB_indexes may be newly included.

Figure 18:
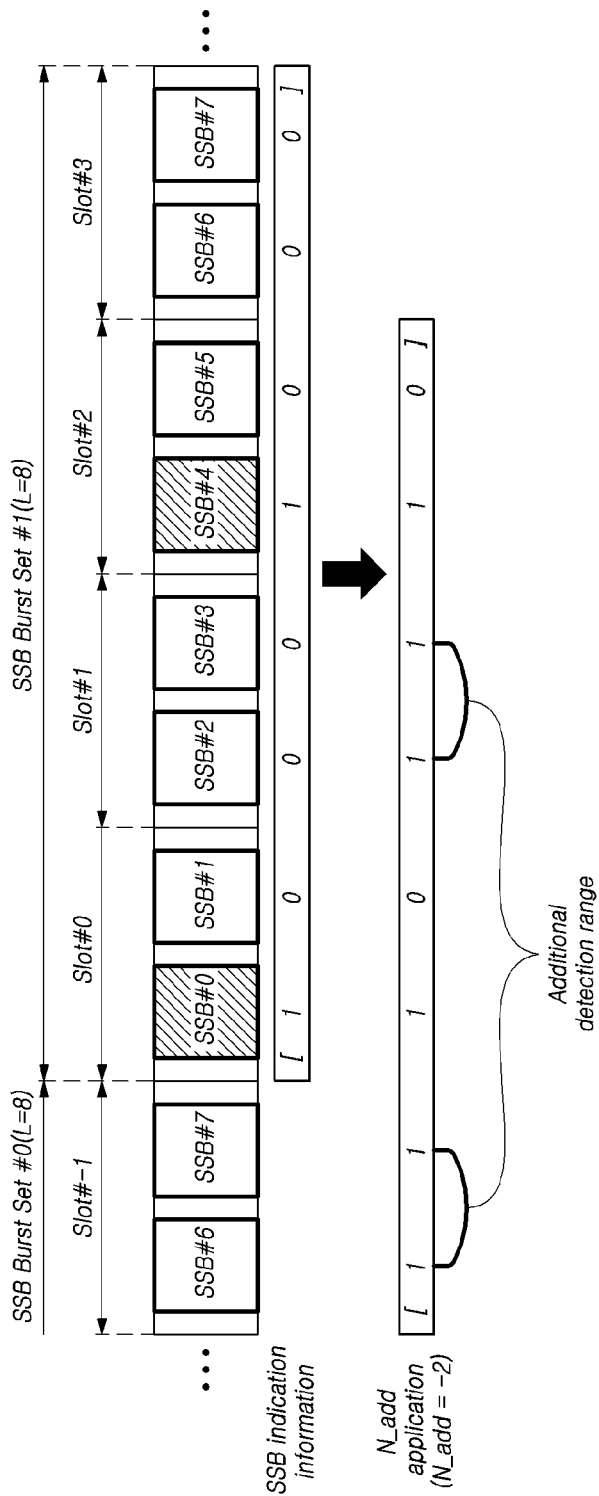

As another example, it is assumed that the N_add value is a negative value, and the existing SSB indication information (L=8) is [10001000]. For example, if N_add is set to −2, the first UE detection attempt SSB_index becomes [0,4], in relation to the SSB_index range where the UE is to perform detection, as shown in FIG. 18. Thereafter, if the N_add value is applied, SSB detection may be performed at the SSB_indexes of [6, 7, 0, 2, 3, 4]. That is, SSB_indexes positioned within the range of −2 including the existing SSB_indexes may be newly included.

Figure 19:
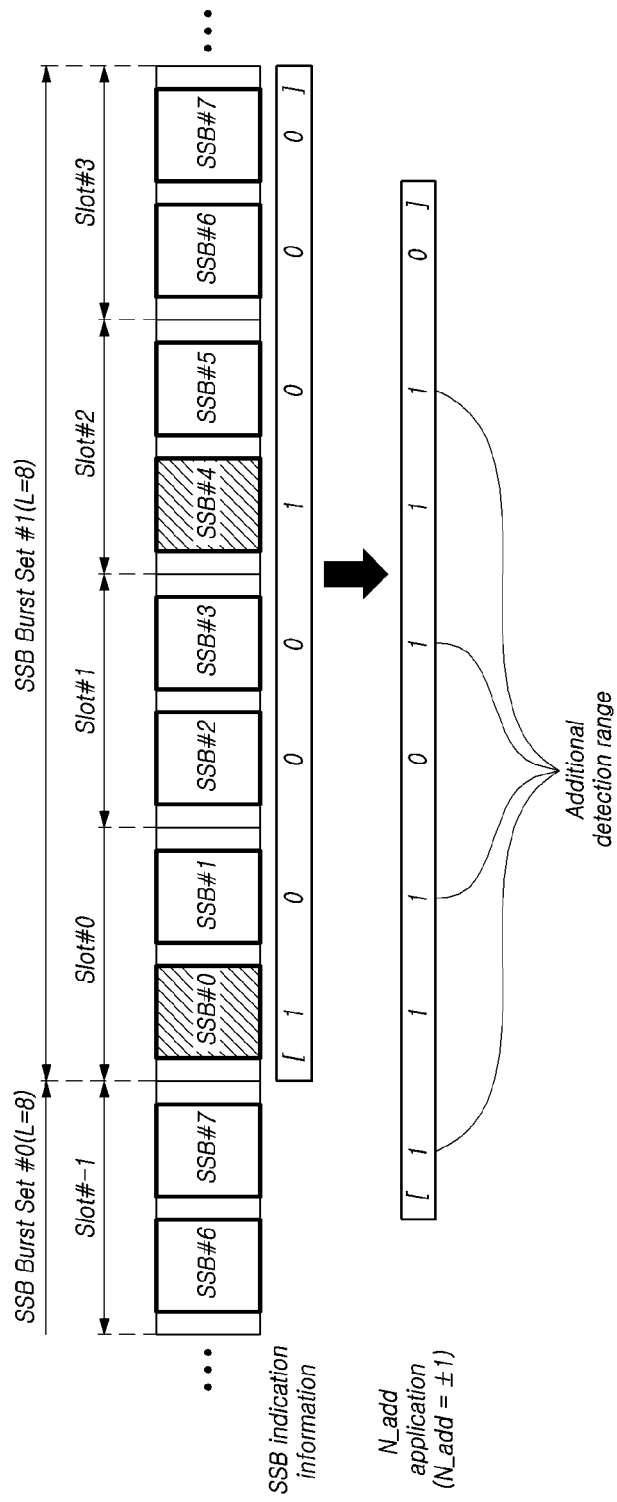

As another example, it is assumed that the N_add value is a positive and negative value, and the existing SSB indication information (L=8) is [10001000]. For example, if N_add is set to ±1, the first UE detection attempt SSB_index becomes [0,4], in relation to the SSB_index range where the UE is to perform detection, as shown in FIG. 19. Thereafter, if the N_add value is applied, SSB detection may be performed at the SSB_indexes of [7, 0, 1, 3, 4, 5]. That is, SSB_indexes positioned within the range of ±1 including the existing SSB_indexes may be newly included.

Figure 20:
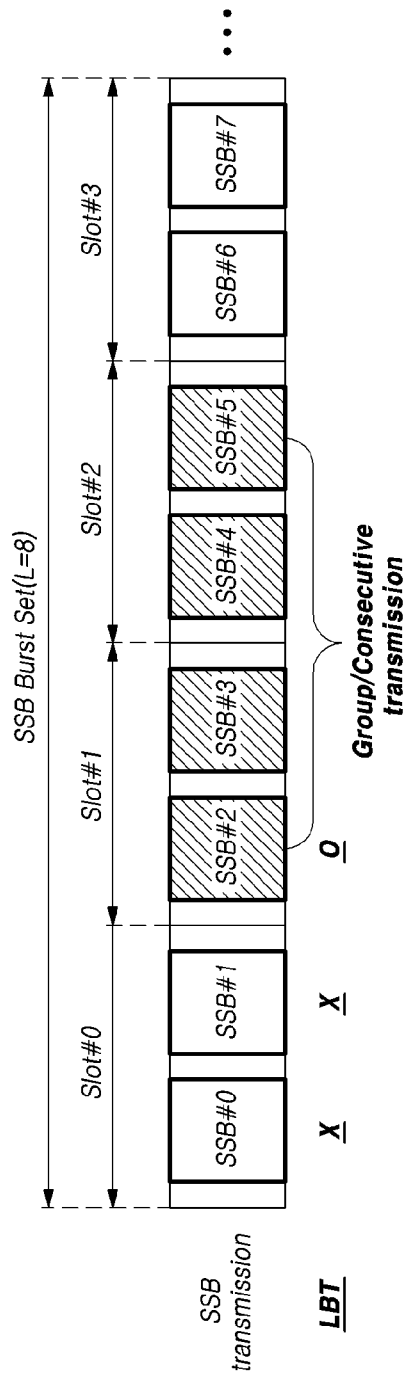
FIG. 20 is a view illustrating SSB consecutive transmission in an unlicensed band according to an embodiment.

Embodiment 3. After LBT Succeeds, the gNB May Consecutively Transfer as Many SSBs as the Time Density of the First SSB Indication Field In embodiment 3, it is assumed that the above-described SSB indication is consecutively performed. In other words, like in legacy NR, the gNB may transfer, to the UE, the SSB indication information where is information where the actual SSB is transmitted in the actual burst set. In this case, the gNB determines whether to transmit the SSB depending on the result of LBT for a predetermined position. Thus, since SSB transmission at the next time is impossible, consecutive SSB transmission corresponding to the existing time density at the time when LBT succeeds may be performed. By so doing, more precise SSB transmission to the UE may be rendered possible. In this case, the number of SSBs consecutively transmitted by the UE may be identical to the number of SSBs in the SSB burst set. In other words, although it may not be transmitted in its transmission position, consecutive transmission may be performed. As shown in FIG. 20, group-wise or consecutive transmissions may be performed from the time when LBT succeeds.

In this case, the gNB may perform consecutive transmissions from the SSB_index where the LBT succeeds and may omit transmission at the next SSB_index. Upon failing in LBT at the first SSB_index time, the gNB may again perform LBT at the next SSB_index time and may perform as many consecutive transmissions as the time density.

The UE may perform consecutive SSB detections at the transmission point of the SSB indication field. The UE may perform detection under the assumption of N SSB consecutive transmissions from the index where the actual SSB is transmitted based on the SSB indication information.

Embodiment 4. A Shift Pattern May Apply Upon SSB Transmission

Unlike those described above, in embodiment 4, single SSB indication information may be provided like in legacy NR. Together with this, an N_shift value may be further designated considering the additional shift pattern. For example, if 'N_shift'=2 is given, SSB detection for the pattern in which it has been+2 moved from the existing position may be attempted. Accordingly, if LBT fails in the corresponding position, a chance of additional transmission of the SSB may be provided depending on whether LBT succeeds in the very subsequent interval. The 'N_shift' value set at this time may be determined to be a single value or be set and defined in several sets. That is, as an example, like N_shift={$a_0$}, a single shift value may be provided. Or, as an example, like N_shift={$a_0, a_1, a_2, \ldots$}, multiple shift value sets may be provided.

Figure 21:
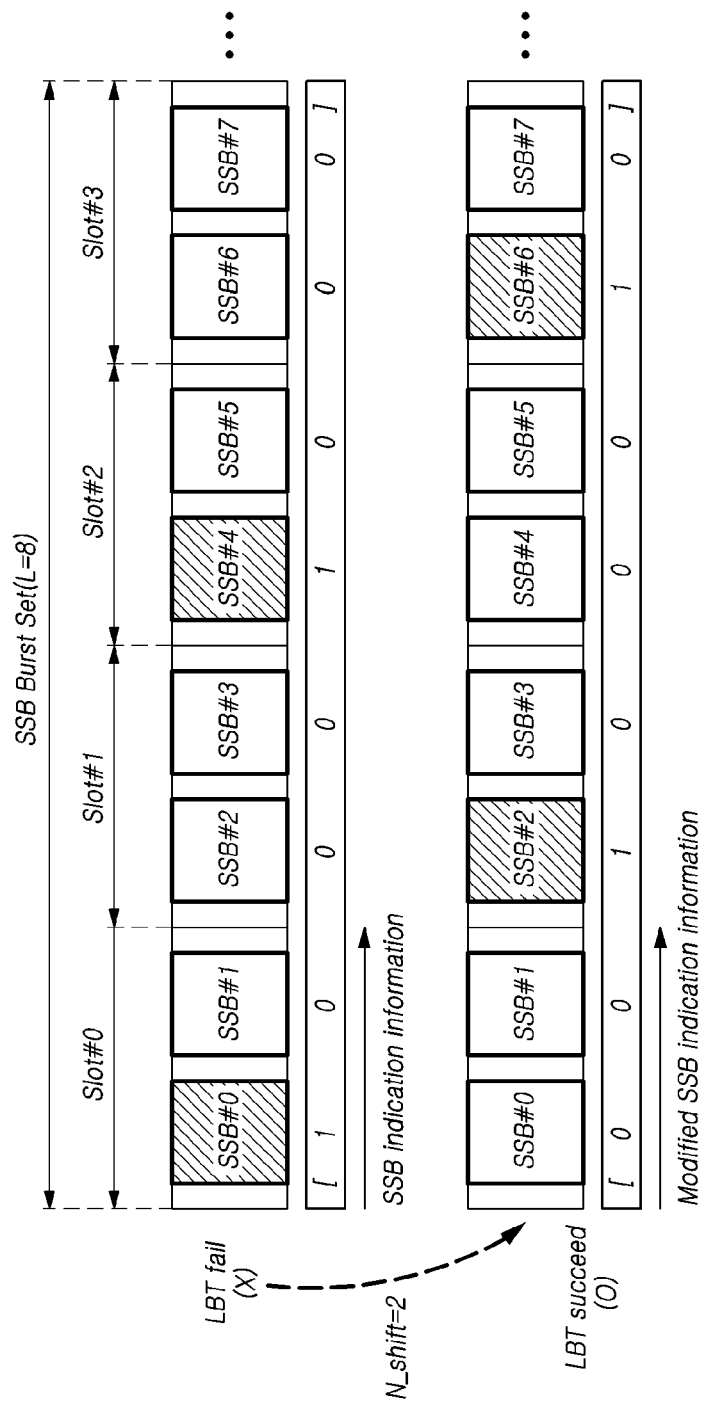
FIG. 21 is a view illustrating shift-based SSB transmission in an unlicensed band according to an embodiment.

FIG. 21 illustrates an example in which when the SSB indication information first transferred by RRC is set to N_shift=2, another SSB transmission chance is provided. In this case, it may be known that the UE need basically detect the SSB_index provided by the shift pattern, in addition to the SSB detection range by the existing SSB indication information.

According to the embodiments described above, there may be provided a method and device for performing wireless communication in an unlicensed band to minimize the transmission/reception complexity of a synchronization signal block considering the results of an LBT upon transmitting a synchronization signal block for access in an unlicensed band.

Hereinafter, a beam management method according to a change to the above-described NR-U SSB/CSI-RS transmission structure will be described. In NR, for beam management, a transmission configuration indicator (TCI) for indicating a beam between a reference RS and a target RS has been adopted.

This may mean a providing of beam pairing information for the reference signal (RS) used for data channel estimation and CSI estimation. Further, it may also be included whether beams are paired between the TRP and the UE. The quasi co-location (QCL) information used for inter-RS beam pairing should be known to the UE. Resultantly, the QCL type may mean the step of dividing the channel similarity between two RSs as follows.

The channel similarity related to the quasi co-location (QCL) type may be divided into {Doppler shift, Doppler spread, average delay, delay spread} in QCL Type A, {Doppler shift, Doppler spread} in QCL Type B, {average delay, Doppler shift} in QCL Type C, and {Spatial Rx parameter} in QCL Type D.

That is, NR has adopted L1-RSRP for beam estimation. As described above, L1-RSRP is performed via SSB and CSI-RS and, in NR-U, transmission of the two RSs is determined depending on whether LBT succeeds.

Thus, described below are a method for determining beam pairing depending on whether to transmit SSB/CSI-RS and a method for beam estimation by the UE when such NR-U beam management characteristics are taken into consideration. Although focusing on SSB, the following description may be applied to CSI-RS in substantially the same manner.

Embodiment 5. Upon SSB/CSI-RS Transmission for Beam Estimation, N Consecutive SSB/CSI-RS Transmissions May be Performed at the Time of LBT Success In embodiment 5, there are proposed consecutive transmissions upon SSB/CSI-RS transmission for beam estimation. This means a slightly different procedure than general SSB transmission or CSI-RS transmission for CSI estimation. That is, this is a procedure basically performed for beam pairing between the gNB and the UE, and the gNB may configure different directional beams for SSB or CSI-RS resources to find the optimal transmission beam. In this case, the UE may derive the L1-RSRP value estimated based on the SSB_index or CSI-RS resource index received in a predetermined position according to the preset SSB or CSI-RS transmission period. Thus, in embodiment 5, a consecutive transmission mode may be adopted upon SSB or CSI-RS transmission in the beam management step, including the steps of beam sweeping and beam refinement considering the characteristics of NR-U.

Basically, consecutive SSB transmissions may be performed from the time when LBT succeeds as shown in FIG. 20. Here, it is assumed that the same transmission density, of 4/8, applies for the SSBs in the SSB burst. In legacy NR, SSB transmission is performed in any position in the SSB burst. However, in the instant embodiment, SSB transmission may be performed while maintaining the same SSB transmission density at the time of LBT success. As an example, an '$N_{SSB\_TX}$' may be separately designated for the SSB transmission density and may differ from the existing value set for synchronization signal configuration. This value may be transmitted to the UE via higher layer signaling.

Figure 22:
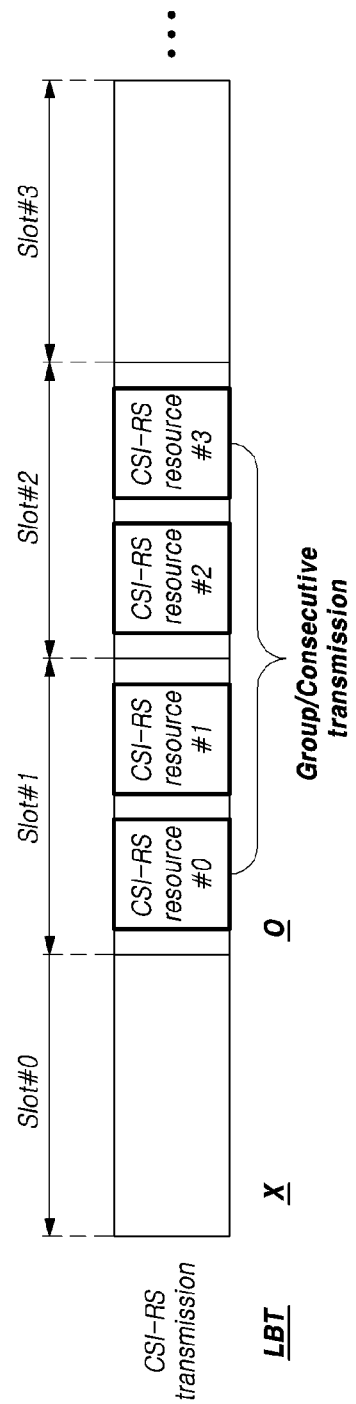
FIG. 22 is a view illustrating post-LBT consecutive CSI-RS transmission in an unlicensed band according to an embodiment.

In the same principle, consecutive transmissions may be supported also for CSI-RS transmission, in as many time regions as the number of CSI-RS resources regardless of the preset transmission period. For example, it is assumed that a total of four CSI-RS resources are configured as shown in FIG. 22. In this case, after LBT succeeds, consecutive transmissions may be performed for the CSI-RS transmission for beam control. In other words, this may mean that consecutive CSI-RS transmissions are performed after LBT succeeds, regardless of the transmission period and transmission positions (time offset) of the CSI-RS resources. Here, the time domain transmission position for each CSI-RS resource may be mapped on a per-slot basis or 'Nx' CSI-RS resources may be positioned in the slot. FIG. 22 illustrates an arrangement in which Nx=2 CSI-RS resources are consecutively transmitted in the slot.

Embodiment 5-1. If the SSB Transmission Position is Changed According to the Result of LBT, the Beamforming Pattern May be Applied from the SSB_Index at the Changed Time In legacy NR, the gNB may transmit SSBs always at predetermined times. Accordingly, different beamforming may apply to each SSB in the SSB burst set and, even in the next period of SSB burst set, such beam application may be set to be repeated. However, since beam transmission is performed after LBT in NR-U, it is not guaranteed to transmit an SSB always in a predetermined position. Accordingly, NR-U may consider the following beam transmission for the case where it is impossible to transmit SSBs always in predetermined positions.

Figure 23:
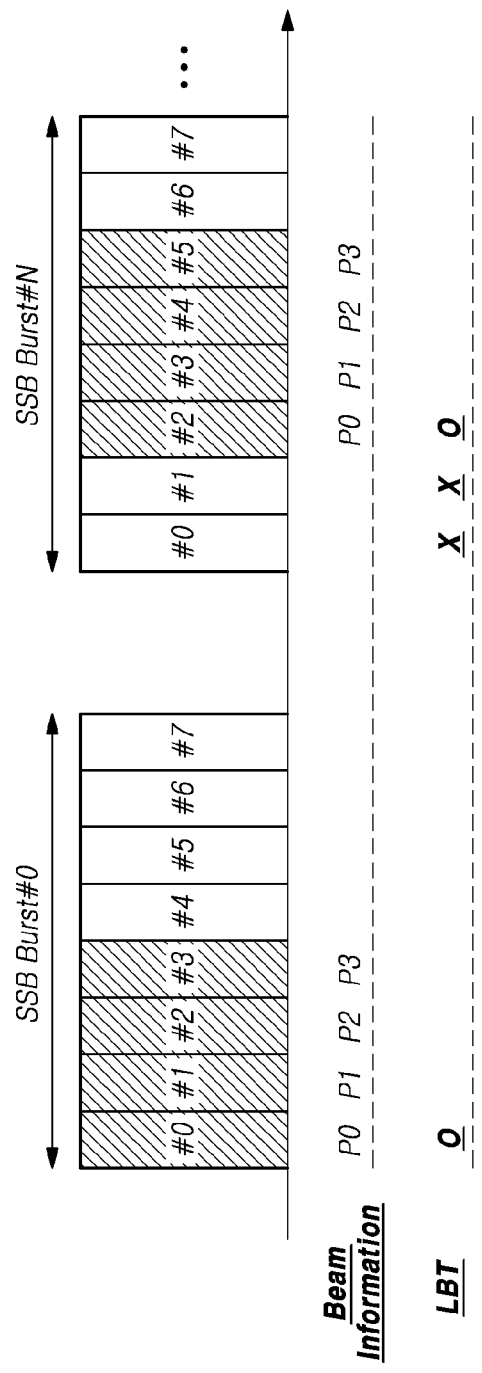
FIG. 23 is a view illustrating SSB transmission and beam setting according to LBT in an unlicensed band according to an embodiment.

Initially, it is assumed that four pieces of SSB transmission information from SSB_index #0 to #3 have been configured in the NR-U UE. However, as shown in FIG. 23, if LBT fails at SSB_index #0 in the next SSB burst #N, four SSB transmissions may be performed from SSB #2, where an additional LBT succeeds, to SSB #5. In this case, for beam estimation, per-SSB L1-RSRP needs to be estimated, and the SSB_index where beam measurement has been performed may become the index indicating the information of the corresponding beam.

That is, although the SSB transmission signaling transmitted to the UE via higher layer signaling is L='11110000,' the transmission signaling where the actual SSB is transmitted becomes L'='00111100.' In this case, the beam information per SSB_index in the SSB burst needs to be updated in SSB burst #N, but since beam P0 is transmitted at SSB #0 and SSB #2, an error may occur in beam update and beam estimation.

Thus, in the instant embodiment, it may be assumed that the LBT-based SSB transmission method described above in connection with FIG. 23 is maintained and, in the UE, beams are always configured according to SSB #0 to #3 set by the first higher layer signaling. That is, it may be assumed that, if the SSB transmission time is changed depending on the LBT, the position (SSB #2) where the actual SSB is transmitted differs but the corresponding beam information is identical to SSB #0. For example, it is assumed that LBT succeeds in the first position so that beam P1 is configured and transmitted at SSB_index #0 and, when LBT succeeds at SSB_index #2 in the next SSB burst #n, beam P1 is transmitted at SSB_index #2. Thus, the UE may update the beam estimation value of SSB #0 in SSB burst #0 to the beam estimation value of SSB #2 in SSB burst #N. At this time, the value the UE reports to the gNB becomes the first set value, SSB_index #0.

Figure 24:
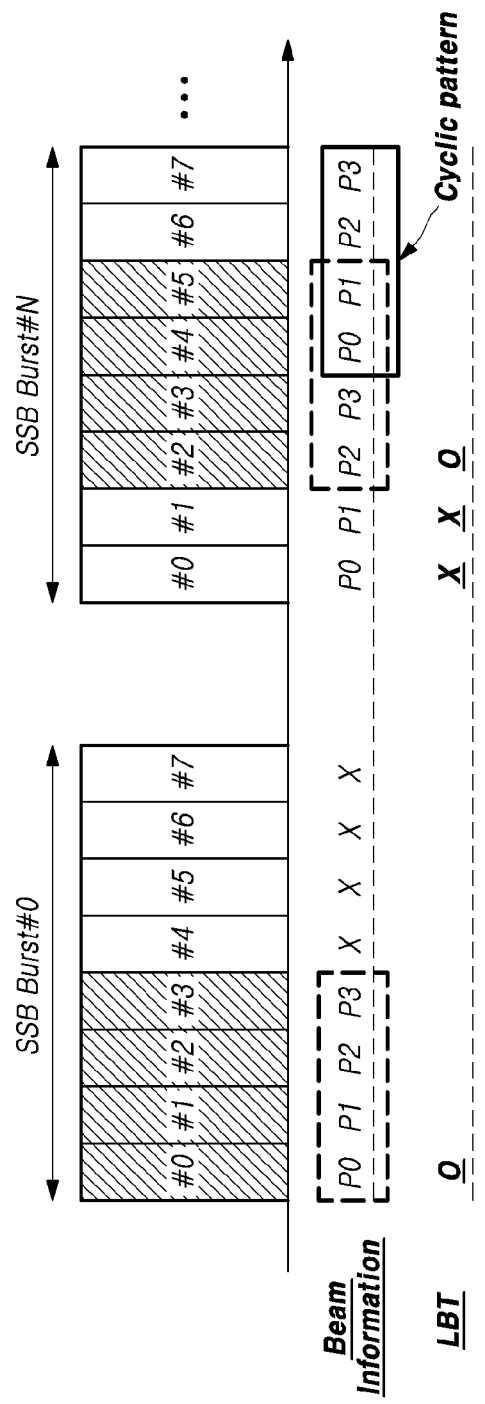
FIG. 24 is a view illustrating a beam setting based on a cyclic pattern in an unlicensed band according to an embodiment.

Embodiment 5-2. If the Position of SSB Transmission is Changed According to the Result of LBT, the Next SSB_Index Beamforming Pattern May Apply Based on the Cyclic Pattern In the instant embodiment, unlike in embodiment 5-1 described above, the initially set beamforming may apply likewise per SSB index. However, in contrast to the initial settings, if the SSB is not transmitted in the predetermined position according to the LBT, beam mapping of SSB indexes newly included in the transmission region may be applied based on the cyclic pattern. For example, as shown in FIG. 24, the SSB transmission positions set via the initial higher layer signaling become #0 to #3. However, it is assumed that synchronization signal transmission is performed at SSB index #2 according to the result of LBT. At this time, since no beam setting has been made at #4 and #5, an additional configuration is needed. According to the instant embodiment, upon SSB continuous transmission, beam mapping for all the SSB indexes may be performed in the form of a cyclic pattern for the initially set beam pattern for the SSBs in the SSB burst. The cyclic pattern form may be previously defined and, given the SSB density of actual transmission in the SSB burst, the pattern may be determined.

Embodiment 6. Where N Consecutive SSB/CSI-RS Transmissions are Performed at the Time of LBT Success for SSB/CSI-RS for Beam Estimation, the UE May Assume the First Time of Reception of SSB/CSI-RS as a Reference Time In connection with embodiment 5 described above, a method of beam setting based on consecutive SSB/CSI-RS transmissions for beam control and estimation has been described. In the instant embodiment, operations of a UE for beam estimation will be described. First, as described above, in NR-U, an SSB transmission which is the most basic synchronization signal is determined depending on whether the LBT succeeds. Thus, for the beam sweeping and beam refinement steps which are basic procedures for beam management, transmission for the beam configured before is needed.

In NR, a resource arrangement and transmission period of SSB and CSI-RS may be configured via higher layer signaling. However, in NR-U, if LBT does not succeed at a desired time although such configured structure is adopted as it is, transmission of the signal is rendered impossible. Resultantly, it is required to adopt a beam management procedure based on consecutive signal transmissions. Here, the gNB may perform SSB/CSI-RS transmission where a different beam setting has been made in a specific position. In this case, the UE may assume a reference point for an update of beam information and position of reception for such SSB/CSI-RS. Resultantly, according to the instant embodiment, UE operations may be designated for two modes: one in which the reference point is applied for the position where SSB/CSI-RS reception has been performed; and the other in which the reference point has not applied.

Embodiment 6-1. Application of Reference Point for Deriving SSB/CSI-RS-Based L1-RSRP by UE In the instant embodiment, the reference point may mean an SSB/CSI-RS transmission point (in particular, a position on the time axis) defined via first higher layer signaling upon SSB/CSI-RS transmission. As described above, if specific SSB_indexes in the first SSB burst are configured via higher layer signaling, the UE may perform SSB reception under the assumption that the SSB is to be transmitted at the corresponding SSB_index. Thus, the first set SSB indication field becomes the reference point.

In this case, in deriving or updating the beam estimation result for the reference point, despite the SSB/CSI-RS estimated in a different position, the beam information, i.e., L1-RSRP value, may be updated in the first set SSB/CSI-RS resource region. That is, although the L1-RSRP value is derived at a different SSB_index/CSI-RS resource index, the UE may update the beam estimation value or L1-RSRP with the first set SSB_index or CSI-RS resource index value.

For example, the indication field first set for the SSBs where actual transmission is performed in the first set SSB burst may be designated as the reference point as shown in FIG. 25. It is assumed in NR-U that for the first transmission, LBT succeeds in a normal position so that the same SSB transmission as the reference point is performed. It is assumed that, for the second SSB transmission, LBT succeeds at a time later than the reference point so that transmission is performed from the position of SSB_index #2. In this case, in practice, the UE assumes that the beam setting of the interval where SSB is transmitted is as shown in FIG. 25. Thus, the UE may update the beam information or estimated value estimated at SSB_index #2 of the second SSB transmission interval at SSB_index #0 which is the reference point. The same principle may apply at SSB_index #3 to #5, so that an update may be performed at SSB_index #1 to #3 of the reference point. By so doing, the gNB may precisely obtain the UE's beam information based on the value reported from the UE. Substantially the same description as above may apply to the CSI-RS.

Embodiment 6-2. Non-Application of Reference Point for Deriving SSB/CSI-RS-Based L1-RSRP by UE In the instant embodiment, unlike in embodiment 6-2 described above, for the SSB/CSI-RS estimated in a different position in deriving or updating the beam estimation result for the reference point, the value derived for the SSB_index/CSI-RS resource index position may be used as it is. An update may be performed at the same index point.

For example, the indication field first set for the SSBs where actual transmission is performed in the first set SSB burst may be designated as the reference point as shown in FIG. 26. It is assumed in NR-U that for the first transmission, LBT succeeds in a normal position so that the same SSB transmission as the reference point is performed. It is assumed that, for the second SSB transmission, LBT succeeds at a time later than the reference point so that transmission is performed from the position of SSB_index #2. In this case, the UE is unaware of actual beam estimation information and may update the beam information or estimated value estimated at SSB_index #2 of the second SSB transmission interval at SSB_index #2 which is the reference point. The same principle may apply at SSB_index #3 to #5, so that an update may be performed at SSB_index #3 to #5 of the reference point. By so doing, the gNB may precisely obtain the UE's beam information based on the value reported from the UE. Substantially the same description as above may apply to the CSI-RS. In this case, if consistency of beam estimation applies, the above-described beam setting structure of embodiment 5-1 may be needed.

Additionally, the gNB has already set that the SSB_indexes where transmission is actually performed are SSB_index #0 to #3. However, a beam estimation result may be obtained even in a non-predetermined position as shown in FIG. 26, also via beam estimation result reporting. Thus, the gNB may regard the reporting for other SSB_indexes in the SSB burst, not the initially set SSB_indexes, as a normal beam estimation procedure.

Further, the UE may perform synchronization signal detection also at the SSB index points in other positions, not the SSB_indexes first set in all of the above-described embodiments.

Embodiment 7. Where SSB is Transmitted in a Different Slot Other than the SSB Via the First RRC Setting, a Slot/SSB Position in the Slot where SSB is Additionally Transmitted May be Indicated In NR, SSBs for which actual transmission occurs in the SSB burst are indicated via RRC signaling. At this time, the size of the bit is L and has a length of '4, 8, or 64.'

Here, if the UE normally receives the RRC signaling regardless of whether to receive the SSB, the UE becomes aware of the positions of the SSBs transmitted from the gNB and be aware of the PDSCH in the position and whether SSBs overlap. Thus, the UE may be aware whether there is a rate-matching for the PDSCH data received in the SSB transmission position, so that it may normally perform PDSCH detection and demodulation. However, in NR-U, SSB transmission changed after LBT succeeds may be performed unlike the SSB indication field 'L' in the first set SSB burst. Thus, to normally demodulate the PDSCH, it needs to be indicated to the UE whether SSB is to be actually transmitted in the PDSCH.

Embodiment 7-1. PDCCH Monitoring for Changing the SSB Position May be Performed

Here, in NR-U, an SSB change may be performed on a per-slot basis or on a per-multislot basis. In other words, the position for transmitting the SSB may be indicated via the UE-specific PDCCH or group-common PDCCH in the CORSET. If the unit of slot monitored at this time is assumed as 'N_p,' all the monitoring fields may be defined as follows. N_p=1, 2, 3, 4, . . . , N slot, monitoring bit size is N_p×2≤L, and L=4, 8, 64 is information set via RMSI. That is, the field may be such an SSB indication field.

In general, two SSBs are transmitted in one NR slot. Thus, one slot has two SSBs, two slots have four SSBs, four slots have 8 SSBs, and 32 slots have 64 SSBs. Thus, SSB change monitoring may target all the SSBs in the maximum SSB burst, and its size is equal to the maximum L=64.

For example, the RNTI for monitoring whether the SSB is changed may be defined as PI_ssb RNTI. However, this is merely an example and, without limitations thereto, PI_ssb RNTI may be denoted in different terms having the same meaning.

The UE detecting PI_ssb RNTI may recognize the SSB_index of the actual transmission in the SSB burst of the previous slot. Thus, the UE may puncture the SSB overlapping region in the buffer for PDSCH detection of the slot or perform rate-matching on the corresponding region. That is, the UE may be aware whether there is rate-matching/puncturing for PDSCH detection depending on whether 'N_p×2' SSB transmissions are performed for the 'N_p' slot positioned in a slot before the slot where SSB position change monitoring has been performed.

Figure 27:
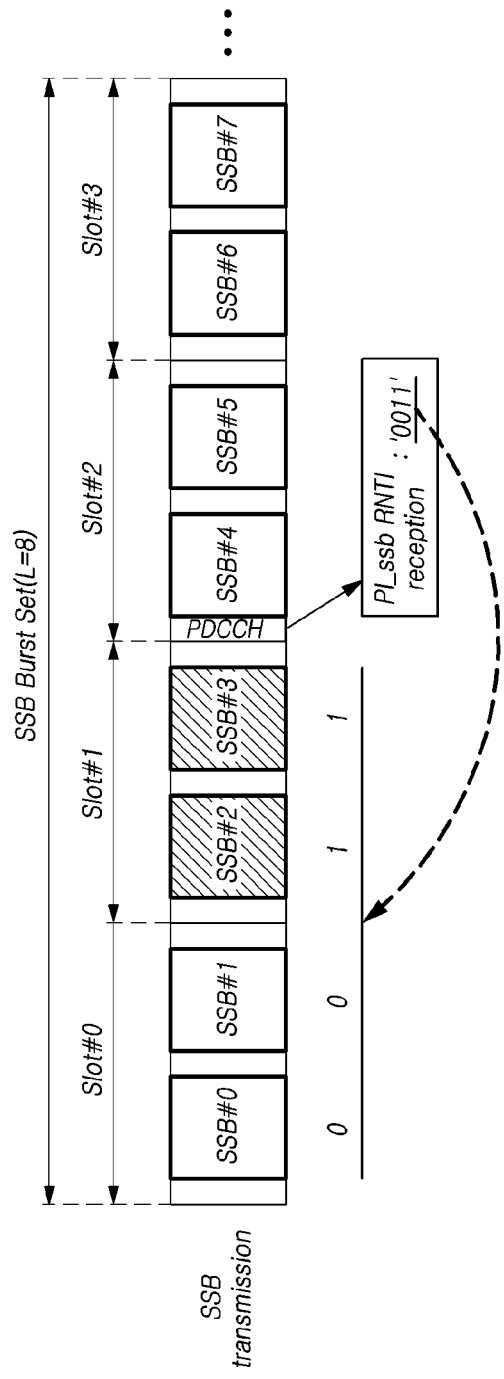
FIG. 27 is a view illustrating application of an SSB change monitoring signal according to an embodiment.

For example, if the UE has received the monitoring bit for whether four SSBs are changed for two slots as '0011' as shown in FIG. 27, the UE may be aware that SSB #2 and 3 have actually transmitted for whether the SSBs are transmitted which are positioned in the prior two slots. Thus, the UE may interpret that SSBs have not actually been transmitted at SSB #0 and #1 of slot #0 and PDSCH has been transmitted and perform PDSCH decoding. Next, since synchronization signals have been actually transmitted at SSB #2 and #3 in slot #1, the UE may perform detection of the received PDSCH under the assumption that the signal of the corresponding region has been rate-matched or punctured.

Embodiment 7-2. The gNB Sets Specific SSB_Indexes in the SSB Burst as Always being Transmitted and Signal the UE In the instant embodiment, unlike embodiment 7-1 described above, information indicating that SSBs may be additionally transmitted at specific SSB indexes may be transmitted in addition to the actual SSB transmission bit set via the RMSI. That is, in NR-U, the UE may be signaled that SSBs may be transmitted in other SSBs in the SSB burst than the initially set region, and the UE may assume that the region overlapping the SSB is rate-matched or punctured upon PDSCH detection in the slot including the SSBs additionally transmitted, based on such received information.

For example, it is assumed that the SSB indication field in the SSB burst received via the existing RMSI is 'L=11000000.' In this case, the UE may assume that SSB is transmitted only in SSB_index #0 and #1, and PDSCH data is transmitted as a whole in the remaining region. However, if the UE receives the additional information 'L_add=00001100' according to the instant embodiment, the UE may recognize that SSB has actually been additionally transmitted even in SSB_index #4 and #5. Thus, if the UE is PDSCH-scheduled in the slot where SSB_index #4 and #5 has been transmitted, the UE may perform PDSCH detection under the assumption that the part overlapping SSB #4 and #5 has been rate-matched or punctured.

Such information about the additional SSB transmission region in the SSB burst may be transmitted to the UE via DCI or may be additionally configured in the UE via RRC.

In the signaling method via DCI, all may be transmitted via the group-common PDCCH or UE-specific PDCCH.

According to the embodiments described above, there may be provided a method and device for performing wireless communication in an unlicensed band to minimize the transmission/reception complexity of a synchronization signal block considering the results of an LBT upon transmitting a synchronization signal block for access in an unlicensed band. Further, there may be provided a specific method and device for performing beam estimation and applying an LBT-based beamforming pattern in an unlicensed band.

Hereinafter, structural configurations of a UE and a base station which may perform all or some of the embodiments described above in connection with FIGS. 1 to 27 will be described with reference to the accompanying drawings.

Figure 28:
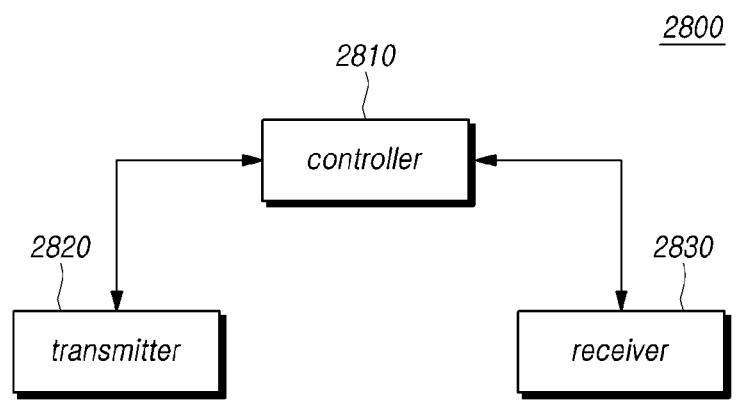
FIG. 28 is a block diagram illustrating a user equipment according to at least one embodiment of the present disclosure.

FIG. 28 is a diagram illustrating a user equipment (UE) according to an embodiment.

Referring to FIG. 28, according to an embodiment, a UE 2800 includes a controller 2810, a transmitter 2820, and a receiver 2830.

The controller 2810 controls the overall operation of the UE 2800 according to the method for performing wireless communication in an unlicensed band needed to perform the above-described disclosure. The transmitter 2820 transmits uplink control information and data or messages to the base station via a corresponding channel. The receiver 2830 receives downlink control information and data or messages from the base station via a corresponding channel.

The receiver 2830 may receive configuration information about a synchronization signal block (SSB) burst set in an unlicensed band. The receiver 2830 may receive configuration information for the SSB burst set for receiving the SSB from the base station. The configuration information may include information about, e.g., SSB burst set period information or continuous interval.

Hereinafter, as an example, it is assumed that the number of SSBs in the SSB burst set at 15 kHz SCS is 8. Since SSB transmission occurs two times in total in one slot, SSB transmission positions may be configured in four slots in the SSB burst.

The receiver 2830 may receive information about the transmission interval for transmitting the SSB in the SSB burst set based on the result of listen before talk (LBT) for the unlicensed band. An LBT needs to be performed for the corresponding unlicensed band to perform SSB transmission in the NR-U cell in the unlicensed band configured by the base station. Where the radio channel in the corresponding unlicensed band is empty as a result of performing the LBT, the base station may transmit the SSB via the radio channel of the unlicensed band.

Thus, the SSB which is transmitted always at a predetermined time may not be transmitted in a slot configured in the unlicensed band. Thus, if LBT fails, transmission interval information for indicating the SSB index for transmitting the SSB in the SSB burst set, may be configured.

For example, it is assumed that for four slots in the SSB burst, the SSB indexes where SSB transmission is possible are set to #0 to #7. That is, in the first half of the first slot, SSB_index=0 and, in the last half, SSB_index=1. Likewise, in the first half of the second slot, SSB_index=2 and, in the last half, SSB_index=3. Sequentially, in the first half of the third slot, SSB_index=4 and, in the last half, SSB_index=5, and in the first half of the fourth slot, SSB_index=6 and, in the last half, SSB_index=7.

According to the initial configuration, such an SSB transmission pattern may be configured in which the SSB is transmitted at SSB_index=0 in the first half of the first slot and SSB_index=4 positioned in the first half of the third slot, and it may be received by the receiver 2830. In this case, the controller 2810 may perform actual synchronization signal detection at SSB_index=0 and SSB_index=4. However, since in the unlicensed band, the base station performs an LBT upon actual SSB transmission and, after LBT succeeds, SSB transmission is performed, SSB transmission at the initially set time may not be guaranteed. Accordingly, information about the transmission interval for transmitting the SSB may be received by the receiver 2830 in the SSB burst set including the information about a change in the SSB transmission position due to LBT failure.

The transmission interval information may include SSB index information at which LBT succeeds in the SSB burst set and SSB is actually transmitted. In this case, as an example, the arrangement of SSB indexes where the SSB is actually transmitted may be flexibly configured in multiple patterns, and a pattern selected by a predetermined criterion may apply. Or, as an example, the SSB index where the SSB is actually transmitted may be indicated via RRC signaling or RMSI.

As another example, the transmission interval information for SSB transmission in the SSB burst set may include cyclic pattern information for transmitting the SSB, which has not been transmitted at the SSB index where LBT failed, after the SSB transmitted at the SSB index where LBT succeeds, in the SSB burst set. For example, it is assumed that the SSB transmission positions set via higher layer signaling are SSB index #0 to #3. Where LBT succeeds at SSB index #2, consecutive transmission of SSBs may be performed at SSB index #2 to #5.

As such, if the SSB transmission position is changed, application of a beamforming pattern for SSB transmission may be set as follows. In other words, in NR, the gNB may transmit SSBs always at predetermined times. Accordingly, different beamforming may apply to each SSB in the SSB burst set and, even in the next period of SSB burst set, such beam application may be set to be repeated. However, since beam transmission is performed after LBT in NR-U, it is not guaranteed to transmit an SSB always in a predetermined position. Accordingly, a configuration of beam transmission for the case where it is impossible to transmit SSBs always in predetermined positions may be taken into consideration in NR-U.

In the above-described example, unlike the initial settings, if consecutive SSB transmission is performed at SSB index #2 to #5, additional settings are needed since no beam setting has been made for #4 and #5. Accordingly, upon SSB consecutive transmission, beam mapping for all the SSB indexes may be performed in the form of a cyclic pattern for the initially set beam pattern for the SSBs in the SSB burst. The cyclic pattern form may be previously defined and, given the SSB density of actual transmission in the SSB burst, the pattern may be determined. For example, the beam pattern set for SSB index #0 and #1 may be applicable to SSB index #4 and #5.

As another example, information about the interval in which the SSB is transmitted in the SSB burst set may include shift value information indicating the SSB index where the SSB is additionally transmitted in the SSB burst set. For example, for the SSB burst set, an N_shift value considering an additional shift pattern, along with single SSB indication information for the SSB index where the SSB is transmitted, may further be designated. For example, if 'N_shift'=2 is given, SSB detection for the pattern in which it has been+2 moved from the existing position may be attempted. Accordingly, if LBT fails in the corresponding position, a chance of additional transmission of the SSB may be provided depending on whether LBT succeeds in the very subsequent interval.

In this case, if the SSB indication information first transferred by RRC is set to N_shift=2, the controller 2810 may basically detect the SSB index provided by the shift pattern, in addition to the SSB detection range by the existing SSB indication information.

The controller 2810 may detect the SSB in the SSB burst set based on the transmission interval information. The transmission interval information including the SSB index for transmitting the SSB in the SSB burst set may be indicated via RRC signaling or RMSI. The controller 2810 may detect the SSB in the slot corresponding to the SSB index for transmitting the SSB in the SSB burst set, based on the transmission interval information. That is, the controller 2810 may detect the SSB even in a position different from the initially set position, depending on the result of LBT. The controller 2810 may obtain synchronization and update system information based on the detected SSB.

According to the embodiments described above, there may be provided a method and device for performing wireless communication in an unlicensed band to minimize the transmission/reception complexity of a synchronization signal block considering the results of an LBT upon transmitting a synchronization signal block for access in an unlicensed band. Further, there may be provided a specific method and device for performing beam estimation and applying an LBT-based beamforming pattern in an unlicensed band.

Figure 29:
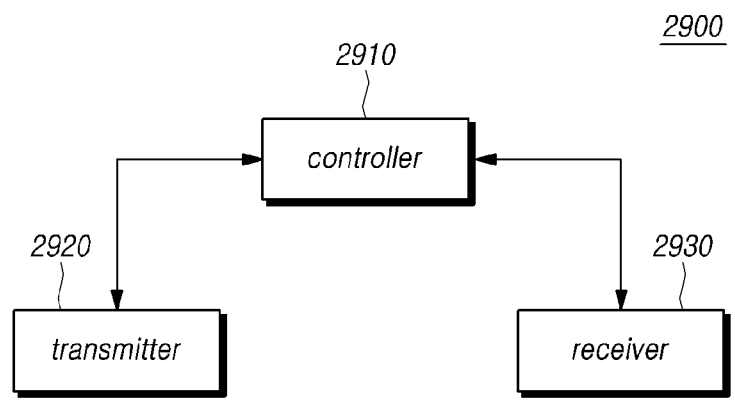
FIG. 29 is a block diagram illustrating a base station according to at least one embodiment of the present disclosure.

FIG. 29 is a diagram illustrating a base station 2900 according to an embodiment.

Referring to FIG. 29, according to an embodiment, a base station 2900 includes a controller 2910, a transmitter 2920, and a receiver 2930.

The controller 2910 controls the overall operation of the base station 2900 according to the method for performing wireless communication in an unlicensed band needed to perform the above-described disclosure. The transmitter 2920 and the receiver 2930 are used to transmit or receive signals or messages or data necessary for performing the above-described disclosure, with the UE.

The transmitter 2920 may transmit configuration information about a synchronization signal block (SSB) burst set in an unlicensed band.

An SSB is defined as an SSB burst set, rather than a single form, and is transmitted. For performing initial access in an unlicensed band of the UE, the transmitter 2920 may transmit configuration information for the SSB burst set for transmitting the SSB. The configuration information may include information about, e.g., SSB burst set period information or continuous interval.

The controller 2910 may perform a listen before talk (LBT) for the SSB burst set in the unlicensed band. An LBT needs to be performed for the corresponding unlicensed band to perform SSB transmission in the NR-U cell in the unlicensed band configured by the base station. Where the radio channel in the corresponding unlicensed band is empty as a result of performing the LBT, the transmitter 2920 may transmit the SSB via the radio channel of the unlicensed band.

For example, it is assumed that for four slots in the SSB burst, the SSB indexes where SSB transmission is possible are set to #0 to #7. That is, in the first half of the first slot, SSB_index=0 and, in the last half, SSB_index=1. Likewise, in the first half of the second slot, SSB_index=2 and, in the last half, SSB_index=3. Sequentially, in the first half of the third slot, SSB_index=4 and, in the last half, SSB_index=5, and in the first half of the fourth slot, SSB_index=6 and, in the last half, SSB_index=7.

For example, if according to the initial configuration, such an SSB transmission pattern may be configured in which the SSB is transmitted at SSB_index=0 in the first half of the first slot and SSB_index=4 positioned in the first half of the third slot, the controller 2910 may perform an LBT for SSB_index=0. If the LBT succeeds, the transmitter 2920 may transmit the SSBs from SSB_index=0, according to the predetermined pattern, for the corresponding unlicensed band, according to the initial settings. However, if the LBT fails, the transmitter 2920 may not perform SSB transmission from SSB_index=0, according to the initial settings.

The transmitter 2920 may transmit information about the transmission interval for transmitting the SSB in the SSB burst set based on the result of LBT. That is, since in the unlicensed band, the base station performs an LBT upon actual SSB transmission and, after LBT succeeds, SSB transmission is performed, SSB transmission at the initially set time may not be guaranteed. Accordingly, information about the transmission interval for transmitting the SSB may be transmitted to the UE in the SSB burst set including the information about a change in the SSB transmission position due to LBT failure.

The transmission interval information may include SSB_index information at which LBT succeeds in the SSB burst set and SSB is actually transmitted. In this case, as an example, the arrangement of SSB_indexes where the SSB is actually transmitted may be flexibly configured in multiple patterns, and a pattern selected by a predetermined criterion may apply. Or, as an example, the SSB_index where the SSB is actually transmitted may be indicated via RRC signaling or RMSI.

As another example, the transmission interval information for SSB transmission in the SSB burst set may include cyclic pattern information to allow the SSB, which has not been transmitted at the SSB_index where LBT failed, to be transmitted after the SSB transmitted at the SSB_index where LBT succeeds, in the SSB burst set. For example, it is assumed that the SSB transmission positions set via higher layer signaling are SSB_index #0 to #3. Where LBT succeeds at SSB_index #2, consecutive transmission of SSBs may be performed at SSB_index #2 to #5.

As such, if the SSB transmission position is changed, application of a beamforming pattern for SSB transmission may be set as follows. In other words, in NR, the gNB may transmit SSBs always at predetermined times. Accordingly, different beamforming may apply to each SSB in the SSB burst set and, even in the next period of SSB burst set, such beam application may be set to be repeated. However, since beam transmission is performed after LBT in NR-U, it is not guaranteed to transmit an SSB always in a predetermined position. Accordingly, a configuration of beam transmission for the case where it is impossible to transmit SSBs always in predetermined positions may be taken into consideration in NR-U.

In the above-described example, unlike the initial settings, if consecutive SSB transmission is performed at SSB_index #2 to #5, additional settings are needed since no beam setting has been made for #4 and #5. Accordingly, upon SSB consecutive transmission, beam mapping for all the SSB_indexes may be performed in the form of a cyclic pattern for the initially set beam pattern for the SSBs in the SSB burst. The cyclic pattern form may be previously defined and, given the SSB density of actual transmission in the SSB burst, the pattern may be determined. For example, the beam pattern set for SSB_index #0 and #1 may be applicable to SSB_index #4 and #5.

As another example, information about the interval for transmitting the SSB in the SSB burst set may include shift value information indicating the SSB_index where the SSB is additionally transmitted in the SSB burst set. For example, for the SSB burst set, an N_shift value considering an additional shift pattern, along with single SSB indication information for the SSB_index for transmitting the SSB, may further be designated. For example, if 'N_shift'=2 is given, SSB detection for the pattern in which it has been+2 moved from the existing position may be attempted. Accordingly, if LBT fails in the corresponding position, a chance of additional transmission of the SSB may be provided depending on whether LBT succeeds in the very subsequent interval.

In this case, if the SSB indication information first transferred by RRC is set to N_shift=2, the UE may basically detect the SSB_index provided by the shift pattern, in addition to the SSB detection range by the existing SSB indication information.

The transmission interval information including the SSB_index for transmitting the SSB in the SSB burst set may be indicated via RRC signaling or RMSI. The UE may detect the SSB in the slot corresponding to the SSB_index for transmitting the SSB in the SSB burst set, based on the transmission interval information. That is, the UE may detect the SSB even in a position different from the initially set position, depending on the result of LBT. The UE may obtain synchronization and update system information based on the detected SSB.

According to the embodiments described above, there may be provided a method and device for performing wireless communication in an unlicensed band to minimize the transmission/reception complexity of a synchronization signal block considering the results of an LBT upon transmitting a synchronization signal block for access in an unlicensed band. Further, there may be provided a specific method and device for performing beam estimation and applying an LBT-based beamforming pattern in an unlicensed band.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for performing wireless communication by a user equipment (UE) in an unlicensed band, the method comprising:
receiving configuration information about a synchronization signal block (SSB) burst set in the unlicensed band;
receiving information about a transmission interval for transmitting an SSB in the SSB burst set based on a result of a listen before talk (LBT) for the unlicensed band; and
detecting the SSB in the SSB burst set based on the transmission interval information,
wherein the transmission interval information includes information about a cyclic pattern for transmitting an SSB which is not transmitted at an SSB index where the LBT fails after an SSB transmitted at an SSB index where the LBT succeeds, in the SSB burst set,
wherein the cyclic pattern information is configured based on beam configuration information related to the SSB index where the SSB is transmitted, and
wherein the beam configuration information includes quasi co-location (QCL) information.

2. The method of claim 1, wherein the transmission interval information includes an SSB index where an SSB is transmitted in the SSB burst set and is indicated via RRC signaling or RMSI.

3. A method for performing wireless communication by a base station in an unlicensed band, the method comprising:
transmitting configuration information about a synchronization signal block (SSB) burst set in the unlicensed band;
performing a listen before talk (LBT) for the SSB burst set in the unlicensed band; and
transmitting information about a transmission interval for transmitting an SSB in the SSB burst set based on a result of the LBT,
wherein the transmission interval information includes information about a cyclic pattern for transmitting an SSB which is not transmitted at an SSB index where the LBT fails after an SSB transmitted at an SSB index where the LBT succeeds, in the SSB burst set, wherein the cyclic pattern information is configured based on beam configuration information related to the SSB index where the SSB is transmitted, and wherein the beam configuration information includes quasi co-location (QCL) information.

4. The method of claim 3, wherein the transmission interval information includes an SSB index where an SSB is transmitted in the SSB burst set and is indicated via RRC signaling or RMSI.

5. A user equipment (UE) for performing wireless communication in an unlicensed band, the UE comprising:

a receiver receiving configuration information about a synchronization signal block (SSB) burst set in the unlicensed band and receiving information about a transmission interval for transmitting an SSB in the SSB burst set based on a result of a listen before talk (LBT) for the unlicensed band; and a controller detecting the SSB in the SSB burst set based on the transmission interval information, wherein the transmission interval information includes information about a cyclic pattern for transmitting an SSB which is not transmitted at an SSB index where the LBT fails after an SSB transmitted at an SSB index where the LBT succeeds, in the SSB burst set, wherein the cyclic pattern information is configured based on beam configuration information related to the SSB index where the SSB is transmitted, and wherein the beam configuration information includes quasi co-location (QCL) information.

6. The UE of claim 5, wherein the transmission interval information includes an SSB index where an SSB is transmitted in the SSB burst set and is indicated via RRC signaling or RMSI.

* * * * *